(12) United States Patent
Rausch et al.

(10) Patent No.: US 9,844,014 B2
(45) Date of Patent: Dec. 12, 2017

(54) ALTERNATIVES TO SATELLITE SIGNALS FOR SYNCHRONIZATION IN MACRO NETWORK

(71) Applicant: Sprint Spectrum L.P., Overland Park, KS (US)

(72) Inventors: Walter Rausch, Shawnee, KS (US); Harry Perlow, Palm Harbor, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 317 days.

(21) Appl. No.: 14/531,767

(22) Filed: Nov. 3, 2014

(65) Prior Publication Data

US 2015/0055636 A1 Feb. 26, 2015

Related U.S. Application Data

(63) Continuation-in-part of application No. 13/872,010, filed on Apr. 26, 2013, now Pat. No. 9,198,147, which is a continuation of application No. 12/814,206, filed on Jun. 11, 2010, now Pat. No. 8,451,814, application No. 14/531,767, which is a
(Continued)

(51) Int. Cl.
| | |
|---|---|
| *H04W 56/00* | (2009.01) |
| *H04H 20/18* | (2008.01) |
| *H04W 4/06* | (2009.01) |
| *H04H 60/50* | (2008.01) |
| *H04H 20/34* | (2008.01) |
| *H04H 60/91* | (2008.01) |

(52) U.S. Cl.
CPC ........ *H04W 56/0015* (2013.01); *H04H 20/34* (2013.01); *H04H 60/50* (2013.01); *H04H 60/91* (2013.01); *H04W 4/06* (2013.01); *H04W 56/00* (2013.01); *H04H 20/18* (2013.01)

(58) Field of Classification Search
CPC .................................... H04W 56/00–56/0025
See application file for complete search history.

(56) References Cited

U.S. PATENT DOCUMENTS

| | | | |
|---|---|---|---|
| 5,538,558 | A | 7/1996 | Ookouchi et al. |
| 5,549,393 | A | 8/1996 | Morando |
| | | (Continued) | |

FOREIGN PATENT DOCUMENTS

| | | |
|---|---|---|
| DE | 10236113 B3 | 4/2004 |
| EP | 0 610 167 A1 | 8/1994 |
| | (Continued) | |

OTHER PUBLICATIONS

Office Action dated Aug. 30, 2012 in U.S. Appl. No. 12/814,206, filed Jun. 11, 2010, 8 pages.
(Continued)

*Primary Examiner* — Marcus R Smith

(57) ABSTRACT

Disclosed herein are methods and systems that may help a base station provide high-speed data communication under a protocol such as LTE or WiMAX, even when a GPS signal is not available to the base station. In an exemplary embodiment, a base station may acquire a high-stability reference signal via a subcarrier of a terrestrial broadcast signal, such as an FM radio signal, and may coordinate the timing frame transmissions with other nearby base stations, instead of relying upon a GPS signal for such functionality.

18 Claims, 19 Drawing Sheets

Related U.S. Application Data continuation-in-part of application No. 13/935,225, filed on Jul. 3, 2013, now Pat. No. 9,247,514, which is a continuation of application No. 13/023,269, filed on Feb. 8, 2011, now Pat. No. 8,503,368.

(56) References Cited

U.S. PATENT DOCUMENTS

| | | |
|---|---|---|
| 5,718,519 A | 2/1998 | Ookouchi et al. |
| 5,954,880 A | 9/1999 | Aoki et al. |
| 6,154,488 A | 11/2000 | Hunt |
| 6,554,904 B1 | 4/2003 | Gimpel et al. |
| 7,156,920 B2 | 1/2007 | Plaetzer et al. |
| 7,175,711 B2 | 2/2007 | Platzer |
| 8,451,814 B2 | 5/2013 | Rausch et al. |
| 9,277,517 B2 | 3/2016 | Rausch et al. |
| 2003/0111777 A1 | 6/2003 | Morando |
| 2007/0189779 A1 | 8/2007 | Murphy et al. |
| 2008/0287153 A1 | 11/2008 | Fullam |
| 2009/0036076 A1 | 2/2009 | Weston et al. |
| 2009/0225743 A1* | 9/2009 | Nicholls ............... H04J 3/0688 370/350 |
| 2009/0276542 A1 | 11/2009 | Aweya et al. |
| 2009/0322603 A1 | 12/2009 | Liao |
| 2010/0067507 A1 | 3/2010 | Park |
| 2010/0080210 A1 | 4/2010 | Kim |
| 2010/0087206 A1 | 4/2010 | Touboul et al. |
| 2010/0192849 A1 | 8/2010 | de Kock et al. |
| 2011/0072469 A1 | 3/2011 | Vare et al. |
| 2011/0081020 A1* | 4/2011 | Loomis ................... G01S 19/14 380/270 |
| 2011/0188480 A1* | 8/2011 | Takagi ............. H04W 56/0015 370/335 |
| 2011/0263269 A1 | 10/2011 | Do et al. |
| 2012/0082188 A2 | 4/2012 | Nicholls et al. |
| 2012/0188125 A1 | 7/2012 | Pomietlasz |
| 2012/0256789 A1* | 10/2012 | Bull ....................... G01S 5/0221 342/357.25 |
| 2012/0275554 A1* | 11/2012 | Lindqvist .......... H04W 56/0035 375/362 |
| 2013/0324173 A1* | 12/2013 | Jarleholm ............. H04W 56/00 455/502 |

FOREIGN PATENT DOCUMENTS

| | | |
|---|---|---|
| JP | 1159359 A | 6/1989 |
| JP | 2153055 A | 6/1990 |
| JP | 10159844 A | 6/1998 |
| WO | 2008/099819 A1 | 8/2008 |

OTHER PUBLICATIONS

Rosum Corporation, Rosum FemtoSynch In-Building Timing and Location for Femtocells, dated Oct. 2008, 16 pages.

Office Action dated Jan. 22, 2013 in U.S. Appl. No. 13/060,691, filed Feb. 25, 2011, 6 pages.

Office Action dated Sep. 9, 2014 in U.S. Appl. No. 13/872,010, filed Apr. 26, 2013, 16 pages.

* cited by examiner

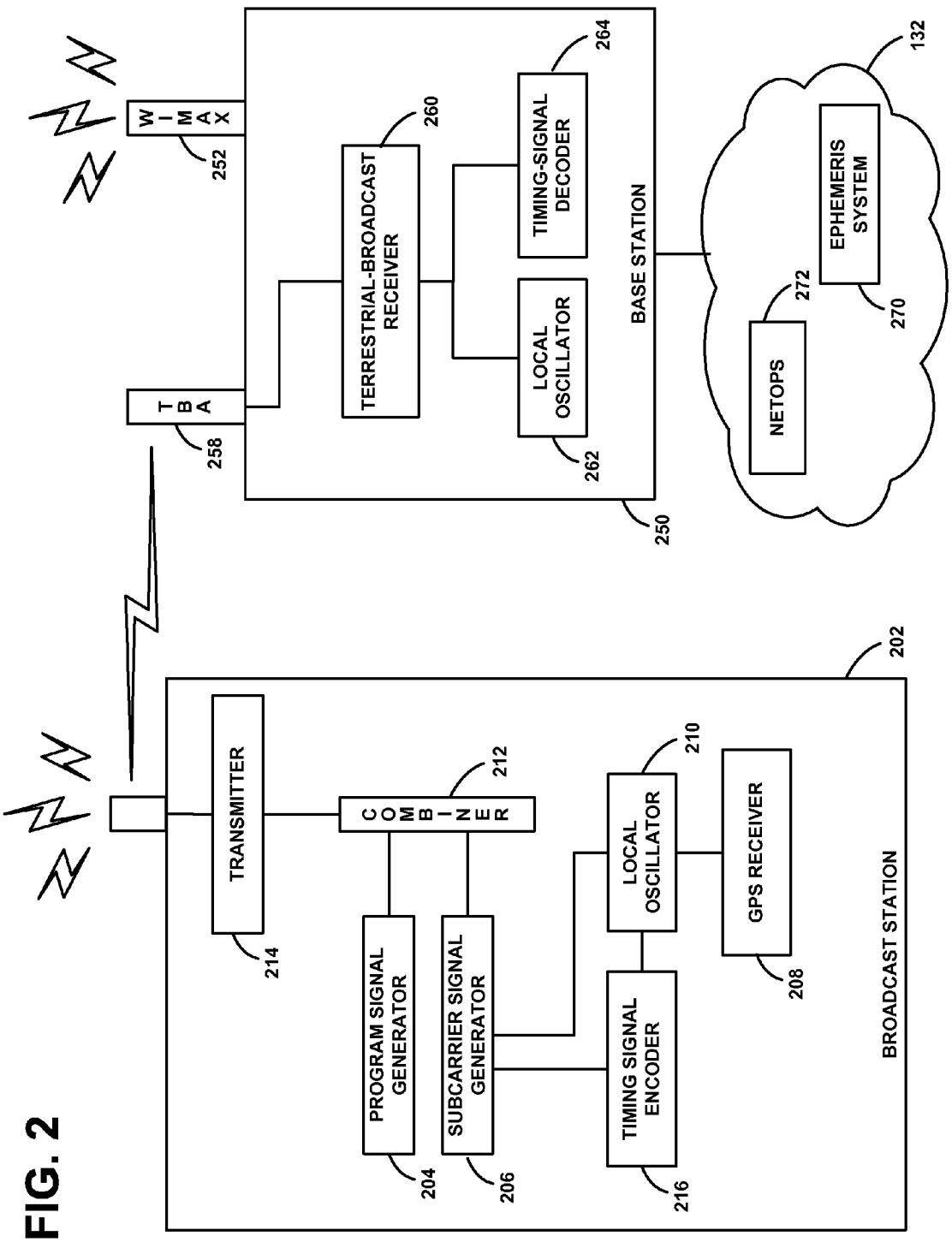

ALTERNATIVES TO SATELLITE SIGNALS FOR SYNCHRONIZATION IN MACRO NETWORK

RELATED APPLICATIONS

This application is a continuation-in part of co-pending U.S. patent application Ser. No. 13/872,010, filed on Apr. 26, 2013, which is a continuation of U.S. patent application Ser. No. 12/814,206, filed on Jun. 11, 2010, and is also a continuation-in part of co-pending U.S. patent application Ser. No. 13/935,225, filed on Jul. 3, 2013, which is a continuation of U.S. patent application Ser. No. 13/023,269, filed on Feb. 8, 2011, all of which are incorporated by reference herein in their entirety.

BACKGROUND

The introduction of Long Term Evolution (LTE), WiMAX, and other high-speed wireless communication protocols has further increased the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of five miles, a throughput on the order of thirty megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on.

WiMAX networks and LTE networks are typically implemented as a macro cellular wireless networks, which typically provide communication services such as voice, text messaging, and packet-data communication. Such mobile stations (which may also be referred to as access terminals, subscriber stations, or client devices, among other terms) and networks typically communicate with each other over a radio frequency (RF) air interface according to one or more wireless protocols (e.g. LTE, WiMAX, CDMA (Code Division Multiple Access), EV-DO (Evolution Data Optimized), and/or one or more others). Mobile stations typically conduct wireless communications with these networks via one or more base transceiver stations (BTSs), each of which send communications to and receive communications from mobile stations over the air interface.

Each BTS is in turn connected with a network entity known as a base station controller (BSC) (which may also be referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

In WiMAX, data communications between a mobile station and a base station (i.e. a BTS, or combinations of one or more BTSs and a BSC) are formatted as Orthogonal Frequency-Division Multiplexed (OFDM) symbols, which are further organized into data frames. As some WiMAX systems employ Transmit Division Duplexing, all base stations in a given market typically begin their transmissions at the same. In particular, the base stations in a given coverage area all begin transmitting each frame at substantially the same time, a concept which is referred to herein as "frame-start synchronization." As there is a five millisecond (ms) frame interval (i.e., each frame has a duration of five ms), this means that the transmitters of each base station turn off and on twenty times per second. Frame-start synchronization may apply similarly in LTE.

OVERVIEW

In order to synchronize transmissions, nearby macro-network base stations typically need a highly-accurate and stable reference signal that can be used to stabilize the base station's transmitter. In addition, the nearby base stations typically need access to a timing signal from a common source so that the transmission of frames can be synchronized. Existing macro-network base stations typically include a highly-stable local oscillator, which stabilizes the base station's transmitter. The local oscillator is typically stabilized using a GPS signal. This local oscillator is typically a rubidium oscillator, although any type of oscillator providing the required accuracy may be employed. Compliance with FCC requirements requires that the local oscillator provide a high degree of signal stability for transmissions. For example, to meet the FCC requirements for stability, a WiMAX base station must generate a radio frequency (RF) signal with a degree of precision around 50 parts-per-billion (ppb). Maintaining this accuracy over time can be a challenge, as local oscillators tend to drift due to factors such as temperature fluctuation.

In practice, current WiMAX, LTE, and other types of macro base stations typically use a Global Positioning System (GPS) signal to calibrate the local oscillator in compliance with the FCC requirements. In particular, a GPS signal typically includes a highly-accurate 10 MHz frequency pulse. As such, the local oscillator at a base station can be phase-locked to the GPS signal and used to stabilize the base-station transmitter. Furthermore, the 10 MHz frequency pulse may serve as a timing signal, which can be used by nearby base stations to synchronize the transmission of data frames (i.e., for frame-start synchronization). Existing WiMAX and LTE base stations may also use a GPS signal for a number of other purposes. More specifically, in addition to using GPS (1) to stabilize a local oscillator and (2) for frame-start synchronization, base stations typically (3) acquire time-of-day information from a GPS signal, which helps the base station to accurately report events to a service provider's network operations center, and (4) use the GPS signal to determine geographic location.

However, relying on a GPS signal can present a problem for a base station, as acquiring a GPS signal typically requires a line-of-sight view of a GPS satellite, which is not available in many locations. Accordingly, exemplary methods and systems are provided herein that help a WiMAX base station operate without requiring a GPS signal for some, or preferably all, of the functions for which a GPS signal is currently used.

Further, exemplary methods and systems may provide redundancy in the event that a GPS signal is unavailable at a given macro-network base station. For example, a base station may be configured to use multiple non-GPS-based techniques to determine its own location, to use multiple non-GPS-based techniques to stabilize its local oscillator, and/or to use multiple non-GPS-based techniques for frame-start synchronization.

In one aspect, an exemplary method involves a first base station in a macro network: (a) receiving a terrestrial broadcast signal from a broadcast station, wherein the signal comprises a subcarrier signal, and wherein the terrestrial broadcast station has phase-locked the subcarrier signal to a GPS signal; (b) decoding the terrestrial broadcast signal to acquire the subcarrier signal; (c) using the subcarrier signal to stabilize a local oscillator at the base station, wherein the local oscillator is used by the first base station to maintain signal stability for wireless communications; (d) receiving a first signal from a second base station in the macro network, wherein the first signal comprises frames; (e) using the first signal to determine timing for transmission of frames of a second signal; and (f) transmitting the second signal, wherein the frames of the second signal are transmitted according to the determined timing.

In another aspect, an exemplary system may be implemented as part of, or may take the form of base station. The base station may include: (i) at least one receiver configured to receive a terrestrial broadcast signal, wherein the broadcast signal comprises a subcarrier signal that has been phase-locked to a GPS signal by the terrestrial broadcast station; (ii) a decoder configured to decode the terrestrial broadcast signal to acquire the phase-locked subcarrier signal; (iii) a local oscillator that is operable to stabilize wireless signal transmissions by a base station; (iv) at least one receiver configured to receive a first signal from a second base station in the macro network, wherein the first signal comprises frames; (v) a non-transitory tangible computer-readable medium; and (vi) program instructions stored on the non-transitory tangible computer-readable medium and executable by at least one processor to cause the core-network entity to: (a) use the phase-locked subcarrier signal to stabilize the local oscillator; (b) use the first signal to determine timing for transmission of frames of a second signal from the first base station; and (c) operate a transmitter of the first base station to transmit the second signal, wherein the frames of the second signal are transmitted according to the determined timing.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 2 is a block diagram illustrating a communication system, according to an exemplary embodiment;

DETAILED DESCRIPTION

Exemplary methods and systems may generally be implemented to allow a macro-network base station without access to a GPS signal to provide some or all of the functionality for which existing macro-network base stations typically rely on GPS. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Exemplary embodiments of the invention may be described herein by way of example, with specific reference to Worldwide Interoperability for Microwave Access (WiMAX) systems. However, it is anticipated that exemplary embodiments may be implemented in any type of macro network, including macro networks operating under air-interface protocols other than WiMAX. For example, exemplary methods and systems may also be employed in the context of Long Term Evolution (LTE) systems such as those currently standardized by the 3$^{rd}$ Generation Partnership Project (3GPP), and those in development (e.g., LTE Advanced) or yet to be developed. Accordingly, descriptions of exemplary embodiments relating to WiMAX systems should not be construed as limiting their applicability to WiMAX or any other particular type of macro network.

Figure 1A:
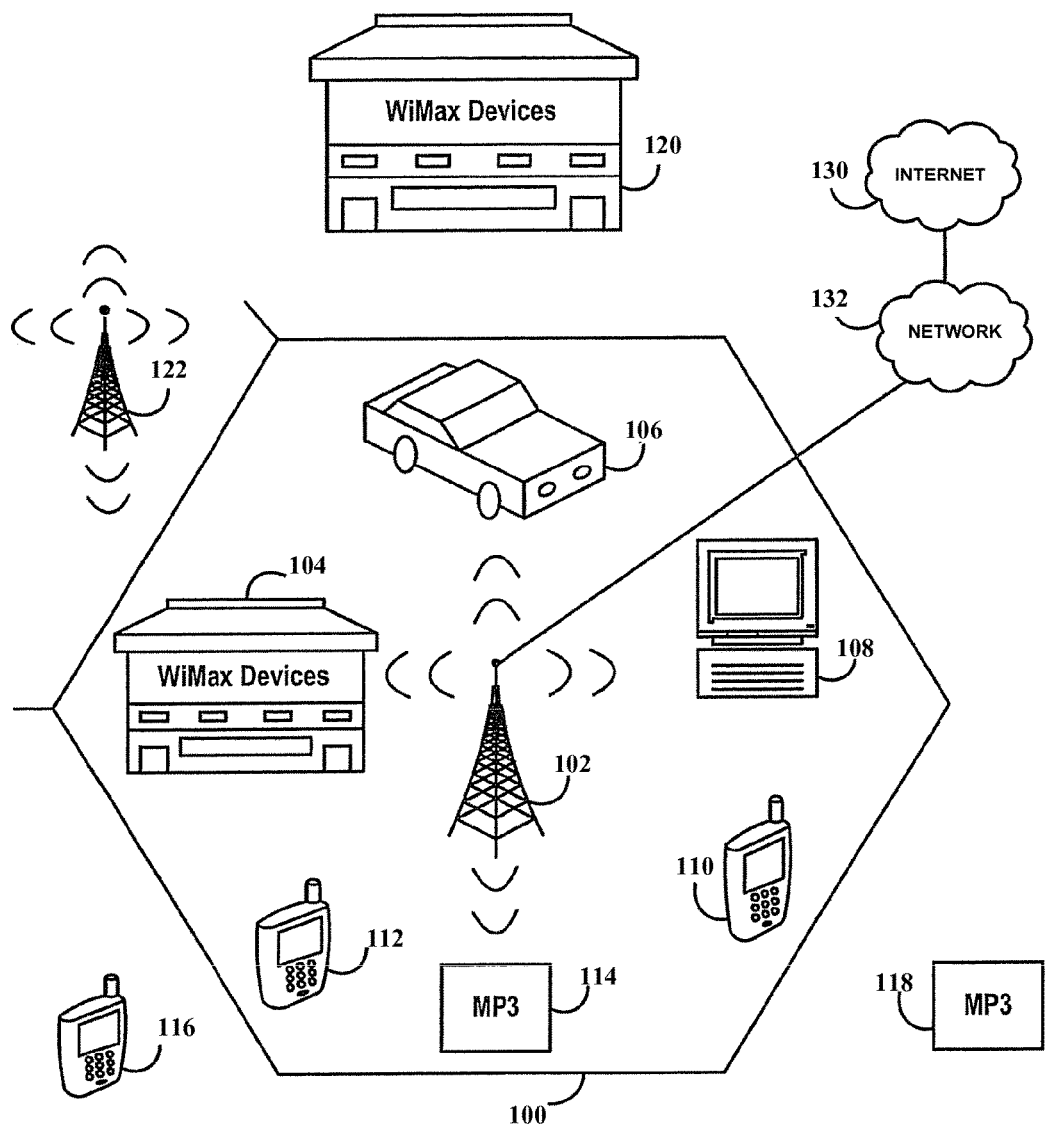
FIG. 1A is schematic representation of a coverage area where service is available from a WiMAX base station.

FIG. 1A is block diagram of a coverage area 100 where service is available from a macro-network base station, which in the illustrated example is a WiMAX base station 102. Also shown are a plurality of client devices that may compete for the resources of the base station 102. The client devices may take the form of, for example, WiMAX-capable devices located in a building or home 104, such as computer, appliance or cell phone, WiMAX-capable devices located in an automobile 106, a portable computer 108, a cellular telephone 110, a personal digital assistant 112, an MP3 player 114, another cell phone 116, another MP3 player 118 and/or various WiMAX-capable devices located within an office building 120 such as computers, cell phones, game players, etc. Additionally or alternatively, the client devices could be LTE-capable devices. Adjacent areas may be covered by other base stations, one of which is shown as base station 122.

Provided with a connection via base station 102, a client device may engage in various types of communication. For instance, a base station 102 may provide connectivity to a packet-switched network 130 such as the Internet. Further, packet-data connectivity may be provided via a service provider's network 132 or directly. In addition to packet-data connectivity, a WiMAX or LTE connection may also provide access to other services such as voice-over-IP (VOIP), among others.

It should be understood that references to a WiMAX base station, such as base station 102, are representative of various types of entities, and generally apply to any entity configured to provide WiMAX service. Such entities may include, but are not limited to, commercial base stations that are installed by service providers, as well as base stations that a subscriber (such as a private consumer or small business) may install in their home or place of business. For example, to address gaps in macro-network coverage (e.g. in buildings) and for other reasons, macro-network service providers may offer consumers devices referred to as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). With respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or WiFi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond. A typical femtocell also has a wireless-communication interface (operating according to WiMAX, CDMA, EV-DO, and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. WiMAX and EV-DO) are supported).

A macro base station 102 typically provides wireless service to client devices by transmitting a signal that is formatted into "frames." As the signal from an exemplary macro-network base station is preferably formatted into frames, it essentially is a string of consecutive frames that are transmitted one after another by the base station.

Figure 1B:
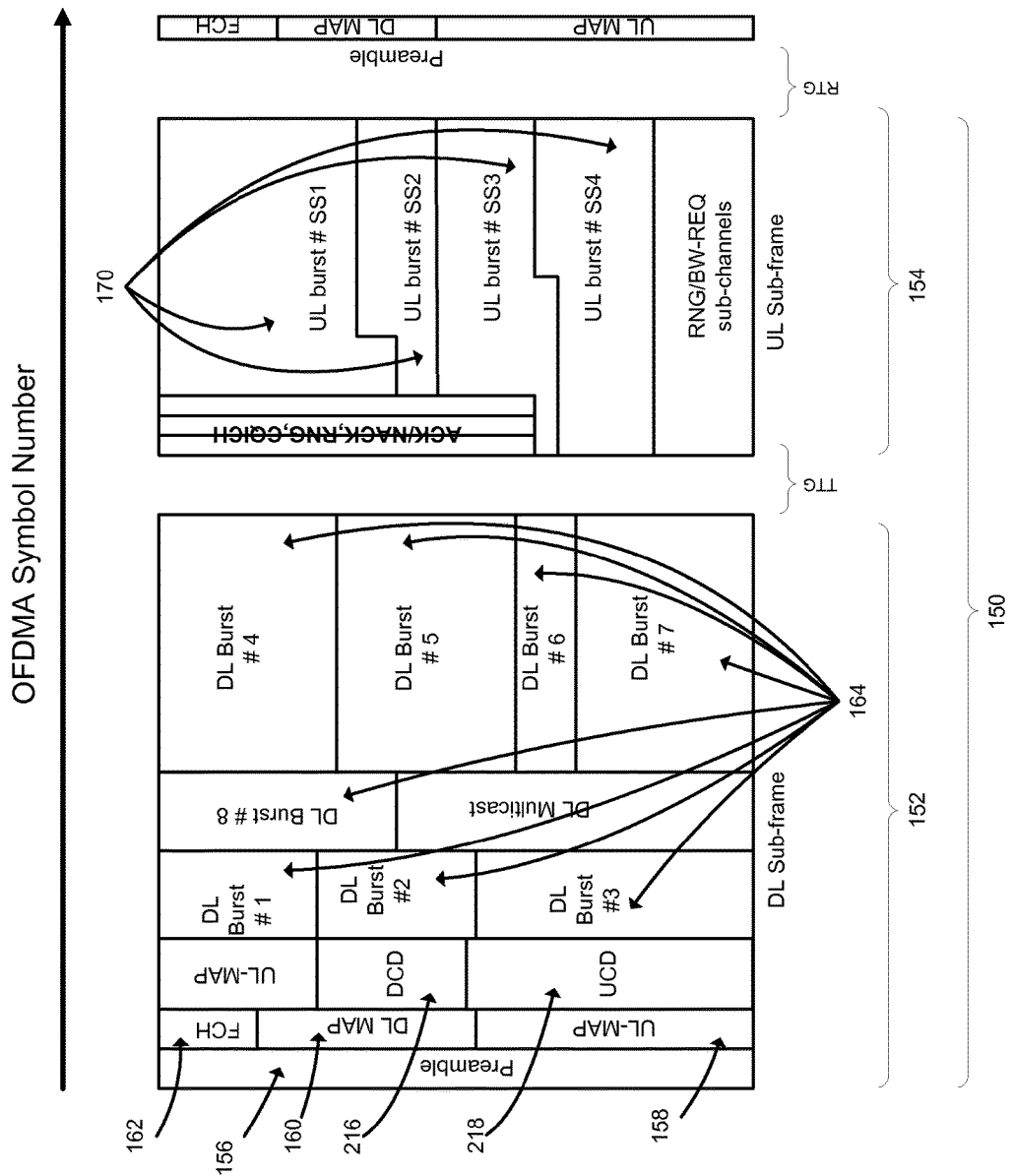
FIG. 1B is a block diagram illustrating the structure of a typical WiMAX frame, according to an exemplary embodiment.

FIG. 1B is a block diagram illustrating the structure of a typical WiMAX frame 150. Each frame 150 includes a downlink (DL) sub-frame 152 and an uplink (UL) sub-frame 154, which together provide various sub-channels and zones for communicating both overhead information (e.g., for session setup, etc.) and user traffic data on the downlink and uplink, respectively. The DL sub-frame 152 typically includes a preamble 156, which is followed by an uplink map (UL-MAP) 158, a downlink map (DL-MAP) 160, a Frame Control Header (FCH) 162, and various DL burst messages 164. Among other information, the UL sub-frame 154 typically includes UL bursts 170. Under WiMAX, the preamble 156, UL-MAP 158, DL-MAP 160, and other such overhead information may be received by any client device within range of the transmitting base station. On the other hand, DL Bursts and UL Bursts typically include user traffic intended for specific client devices, and thus are available only to those clients for which they are intended.

In a further aspect of WiMAX, nearby base stations are required to synchronize frame transmissions with each other. In an exemplary embodiment, the preamble 156 is typically the first OFDM symbol in each WiMAX frame 150. Therefore, to synchronize their frame transmissions, nearby WiMAX base stations each begin transmitting the preamble of every WiMAX frame at substantially the same time. To accomplish frame-start synchronization in practice, existing WiMAX base stations receive a highly-accurate and stable 1 pulse/sec (pps) GPS timing signal that, after each base station has adjusted for the respective time-of-flight delay between the base station and GPS satellite, provides a common reference signal for nearby base stations. Accordingly, the transmission of WiMAX frames in each base station may then be edge-triggered by the leading edge of the 1 pps GPS timing signal. In practice, as the duration of each frame is much less than one second, every 200$^{th}$ frame is edge-triggered by the 1 pps GPS timing signal.

I. GPS Alternatives using Subcarrier of Terrestrial Broadcast Signal

FIG. 2 is a block diagram illustrating a communication system, according to an exemplary embodiment. In one aspect, the communication system includes a broadcast station 202, which may be any entity configured for terrestrial broadcast services, such as an FM radio station for instance. In an exemplary embodiment, the broadcast station 202 may radiate a broadcast signal, which includes a subcarrier that is phase-locked to a GPS signal and thus serves as a high-stability reference signal for a Macro base station 250. Further, the broadcast station 202 may modulate timing information for frame-start synchronization, and/or TOD information, onto the subcarrier. Yet further, Macro base station 250 may be pre-programmed with its location or configured to determine its location using non-GPS means (such as a local Internet connection, for instance). With this arrangement, Macro base station 250 may be fully operational without any use of GPS, as all functions for which a GPS signal would otherwise be used (e.g., local-oscillator stabilization, frame-start synchronization, obtaining TOD information, and/or location determination), may be accomplished using the subcarrier and/or non-GPS location information.

However, while it is preferable that Macro base station 250 be fully operational without relying on a GPS signal, it should be understood that in some embodiments, Macro base station 250 may use the subcarrier to replace GPS for some purposes, but still use GPS for other purposes. Moreover, it is even possible that the subcarrier be used alongside or in conjunction with GPS, with the subcarrier and GPS providing some or all of the same functionality.

Referring now to the broadcast station 202, it includes a program signal generator 204, which may be configured to modulate program information onto a baseband carrier, and a subcarrier signal generator 206, which is configured to generate a subcarrier signal. The broadcast station 202 also includes a GPS receiver 208 and a high-stability local oscillator 210, which may both be used, along with the subcarrier signal generator 206, to provide high-stability subcarrier that is phase-locked to a GPS reference signal. Combiner 212 may function to combine the program information from program signal generator 204 and the subcarrier signal from subcarrier signal generator 206 for broadcast by transmitter 214. Configured as such, the subcarrier may be used by base station 250 as a high-stability reference signal for stabilizing the base station's local oscillator.

In a further aspect, broadcast station 202 includes a timing signal encoder 216. The timing signal encoder 216 is also stabilized by the high-stability oscillator 210, and thus phase-locked to the GPS timing signal acquired by GPS receiver 208. Preferably, the timing signal encoder 216 generates a frequency shift keying (FSK) timing signal, which is then modulated onto the subcarrier generated by subcarrier signal generator 206. For instance, the FSK timing signal may be a binary FSK signal having transitions that occur at the same rate as WiMAX frames (i.e., the period between transitions is 5 ms—the same duration as a WiMAX frame). In so doing, the subcarrier provides a reference timing signal, from which base station 250 can derive timing information for frame-start synchronization. Therefore, base station 250 may rely on the timing information modulated onto the subcarrier for frame-start synchronization, instead of a GPS timing signal received at the base station.

In yet a further aspect, timing signal encoder 216 may be configured to embed time-of-day (TOD) information in the timing signal. For instance, in an exemplary embodiment, timing signal encoder 216 may periodically interrupt the timing signal by ceasing to encode timing information in the timing signal, or ceasing output of the timing signal altogether, for a predetermined period of time. After this predetermined period, the timing signal encoder 216 may output TOD information (which may be acquired from the GPS timing signal output from GPS receiver 208), and then resume outputting the timing signal. As this transition and TOD information is broadcast in the subcarrier, the subcarrier may thus provide base station 250 with TOD information, which it would otherwise acquire directly from a GPS timing signal.

In a further aspect, timing signal encoder 216 may also embed location data (e.g., GPS coordinates), which indicates the location of the broadcast station 202, in the timing signal. This location data may allow a base station receiving the timing signal to calculate the distance between the base station and the broadcast station 202, in order to account for time-of-flight delay.

Referring now to base station 250, it may be any type of macro base station, such as a WiMAX- and/or LTE-enabled base station. As shown, base station 250 includes a WiMAX antenna 252 that it may use to provide service to WiMAX devices operating in its coverage area. In an exemplary embodiment, base station 250 is configured to use the subcarrier signal that is broadcast by broadcast station 202 as a reference signal, with which base station 250 stabilizes its local oscillator. Further, base station 250 may be configured to use the timing signal, which is modulated onto the subcarrier by broadcast station 202, for frame-start synchronization. As such, base station 250 includes a terrestrial broadcast antenna (TBA) 258 and a broadcast receiver 260 for receiving the broadcast signal from broadcast station 202.

Configured as such, base station 250 may use the subcarrier signal to support at least some, and preferably all, of the functionality for which GPS would otherwise be used. More specifically, broadcast receiver 260 may include a subchannel decoder that operates to extract the subcarrier from the received broadcast signal. As the subcarrier has been phase-locked to the GPS timing signal by the broadcast station 202, it provides a highly-accurate reference signal, which base station 250 may then use to stabilize its own local oscillator 262. In particular, base station 250 may phase-lock the frequency of local oscillator 262 to the subcarrier. By doing so, base station 250 may stabilize is local oscillator 262 without access to a GPS satellite.

Furthermore, base station 250 may include a timing signal decoder 264 that is configured to demodulate the subcarrier signal in order to obtain the timing signal that was modulated onto the subcarrier at broadcast station 202. In an exemplary embodiment, the timing signal is an FSK timing signal. As such, base station 250 may achieve frame-start synchronization by transmitting WiMAX frames such that the timing of frames corresponds to the transitions of the FSK timing signal. In particular, to transmit each frame, the base station 250 may apply a time advance from each transition, which accounts for the time-of-flight delay between broadcast station 202 and base station 250, and then transmit the frame. Furthermore, nearby base stations may likewise be configured to apply time advances, which are based on their respective time-of-flight delays to broadcast station 202. Therefore, by applying their respective time advances to the FSK timing signal, base station 250 and the nearby base stations can effectively synchronize the transmission of each frame.

Preferably, the time advance (which may also be referred to as a timing offset) that base station 250 applies for frame-start synchronization is provided by an ephemeris system 270 that is part of, or accessible through, service provider network 132. In particular, base station 250 may send its own geographic coordinates, along with the broadcast frequency of the broadcast station 202, to ephemeris system 270. Ephemeris system 270 may then be configured to access a database (not shown), which identifies broadcast stations by their broadcast frequency, and provides each station's geographical coordinates. As such, the ephemeris system 270 may query this database with the broadcast station frequency reported by base station 250 to determine the location of broadcast station 202. The ephemeris system 270 may then use the location of broadcast station 202 and the location of base station 250 to calculate the time-of-flight delay, and corresponding time advance that should be used by base station 250. The ephemeris system 250 may then send this time advance to base station 250.

Alternatively, base station 250 may itself determine the time advance. To do so, base station 250 may use various techniques to determine the time-of-flight delay from broadcast station 202, which base station 250 may then apply as a time advance for frame-start synchronization. In such embodiments, base station 250 typically calculates the distance between base station 250 and broadcast station 202 (which may involve the base station determining the location of the broadcast station 202 and its own location), and uses this distance to determine the time-of-flight delay to the broadcast station 202. In particular, the time-of-flight delay may be set equal to the product of the distance to the broadcast station 202 multiplied by a known constant speed at which the broadcast signal travels.

To determine its own location (either to send to ephemeris engine 270, or to use to itself determine the time advance), base station 250 may use various techniques. For instance, the base station's own location may be pre-programmed into base station 250. In particular, a service provider, knowing the location of the installation, may input the latitude and longitude of the base station 250 during installation. Alternatively, a base station 250 may derive its own location via an Internet connection, and in particular may determine its physical location via a database lookup from the internet service provider's MAC Address/location subscriber database in which the base station's location is typically recorded during the registration process.

Further, in embodiments where base station 250 itself determines the time advance, the base station may use various techniques to determine the location of the broadcast station 202. For example, base station 250 may be provided with access to a database of broadcast stations identified by their RF frequencies, and their corresponding geographical coordinates. As such, the base station 250 may query this database to determine the location of a broadcast station 202 from which the timing signal is received. Alternatively, the timing signal itself may include location data indicating the location of broadcast station 202, which base station 250 may extract along with the timing information. Generally, it should be understood that any technique for determining distance to the broadcast station and/or the corresponding time advance (e.g., the time-of-flight delay) may be employed, without departing from the scope of the invention.

In another aspect, base station 250 may extract the time-of-day information embedded in the received timing signal. To do so, the base station 250 may detect an interruption in the timing information, then look for the time-of-day information. The base station 250 may then use the extracted time-of-day information to send a timestamped report to Network Operation Center (NETOPS) 272, which is maintained by the service provider.

Figure 3A:
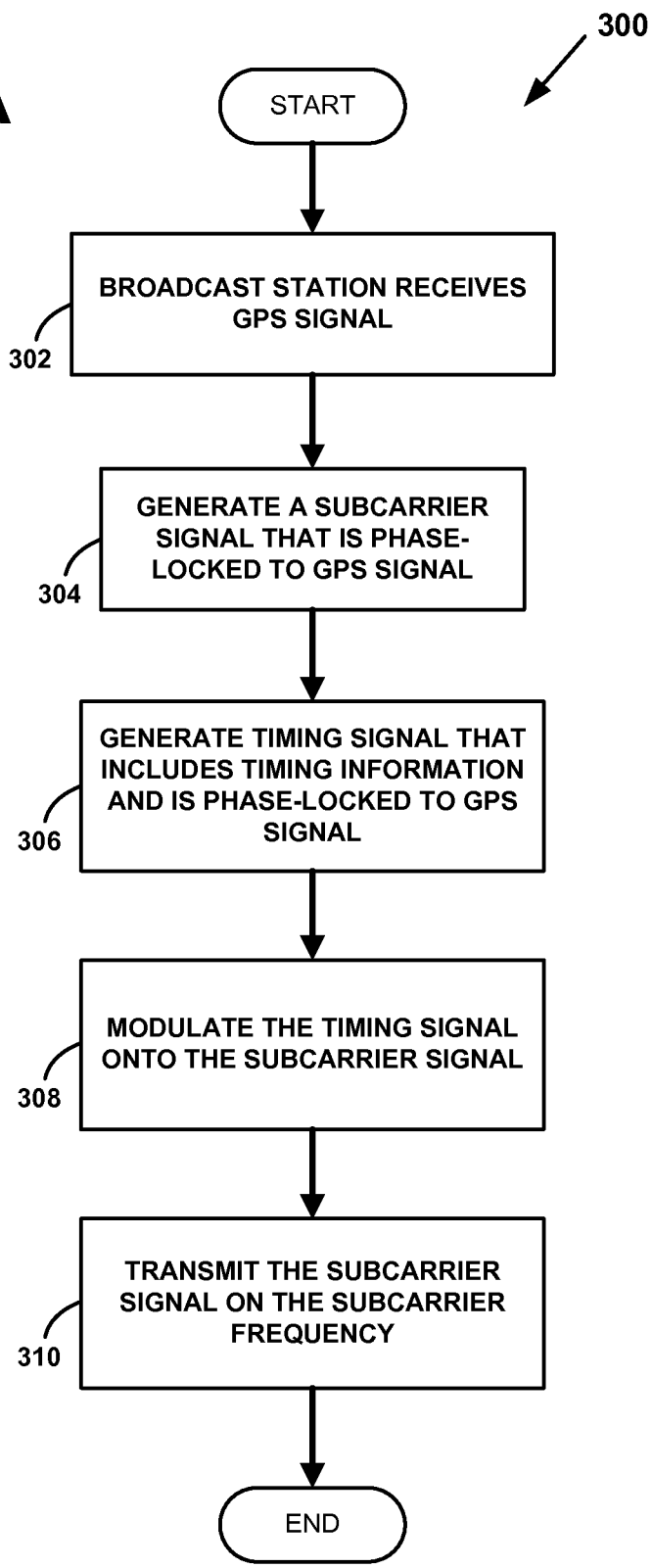
FIG. 3A is a flow chart illustrating a method, according to an exemplary embodiment.

FIG. 3A is a flow chart illustrating a method 300 according to an exemplary embodiment. The method is described by way of example as being carried out by a broadcast station. It should be understood that functions that are described as being carried out by a broadcast station may be carried out by any entity implemented by or provided to a broadcast station. Such entities include, but are not limited to, entities related to generating and broadcasting a terrestrial broadcast signal, and other entities communicatively coupled to such entities.

Method 300 involves the broadcast station receiving a GPS signal, as shown by block 302. The broadcast station then generates a subcarrier signal that is phase-locked to the GPS signal, and thus serves as a high-stability reference for a macro base station, as shown by block 304. In addition, the broadcast station generates a timing signal that is also phase-locked to the GPS signal, and includes timing information, as shown by block 306. The base station then modulates the timing signal onto the subcarrier signal, as shown by block 308. The broadcast station then transmits the subcarrier signal on the subcarrier frequency, as shown by block 310. By so doing, the broadcast station provides the subcarrier for use by a macro base station, which may decode the subcarrier signal and use it as high-stability reference signal to stabilize its local oscillator. Further, the macro base station may demodulate the subcarrier to extract the timing signal and timing information contained therein. The timing information can then be used by the macro base station for frame-start synchronization.

Figure 3B:
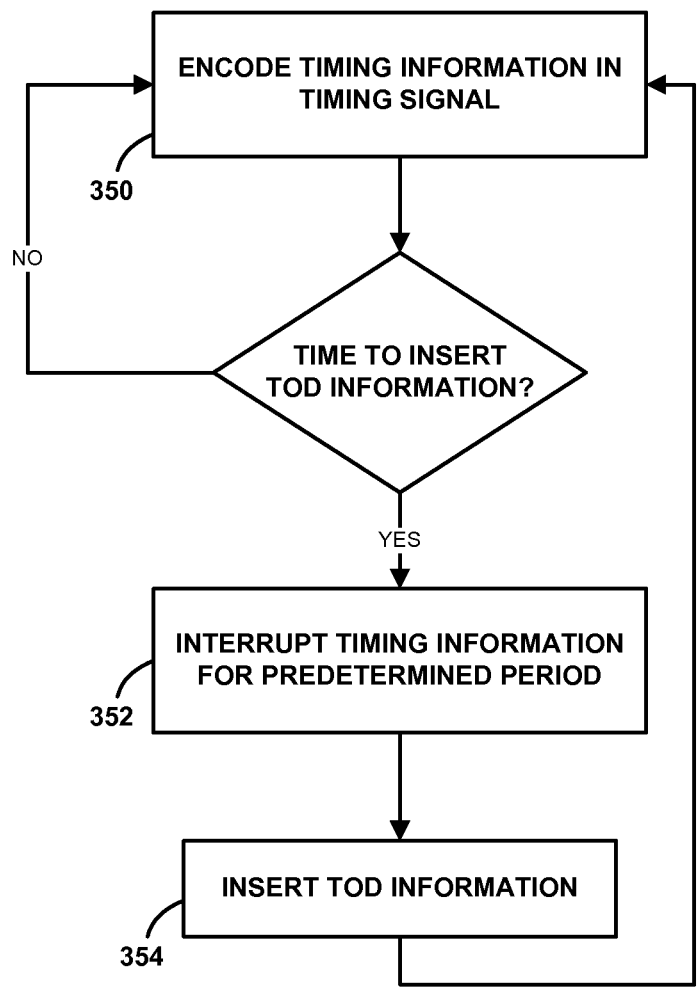
FIG. 3B is another flow chart illustrating a method, according to an exemplary embodiment.

FIG. 3B is a flow chart illustrating an additional aspect of an exemplary method, in which the broadcast station includes time-of-day (TOD) information in the timing signal that is modulated onto the subcarrier. In particular, the broadcast station may continually encode timing information in the timing signal it outputs, as shown by block 350. For instance, the broadcast station may encode timing information in the timing signal using frequency shift keying (FSK). Then, to provide TOD information, the broadcast station periodically interrupts (i.e., stops encoding) the timing information for a predetermined period of time, as shown by block 352. This interruption indicates that TOD information will follow. Accordingly, after interrupting the timing information and waiting for the predetermined period of time, the broadcast station inserts TOD information in the timing signal (e.g., encodes the TOD information in the timing signal), as shown by block 354. After inserting the TOD information, the broadcast station resumes encoding timing information in the timing signal, as shown by block 350. Accordingly, the broadcast station may repeatedly perform this method to periodically provide TOD information via the timing signal.

Figure 4:
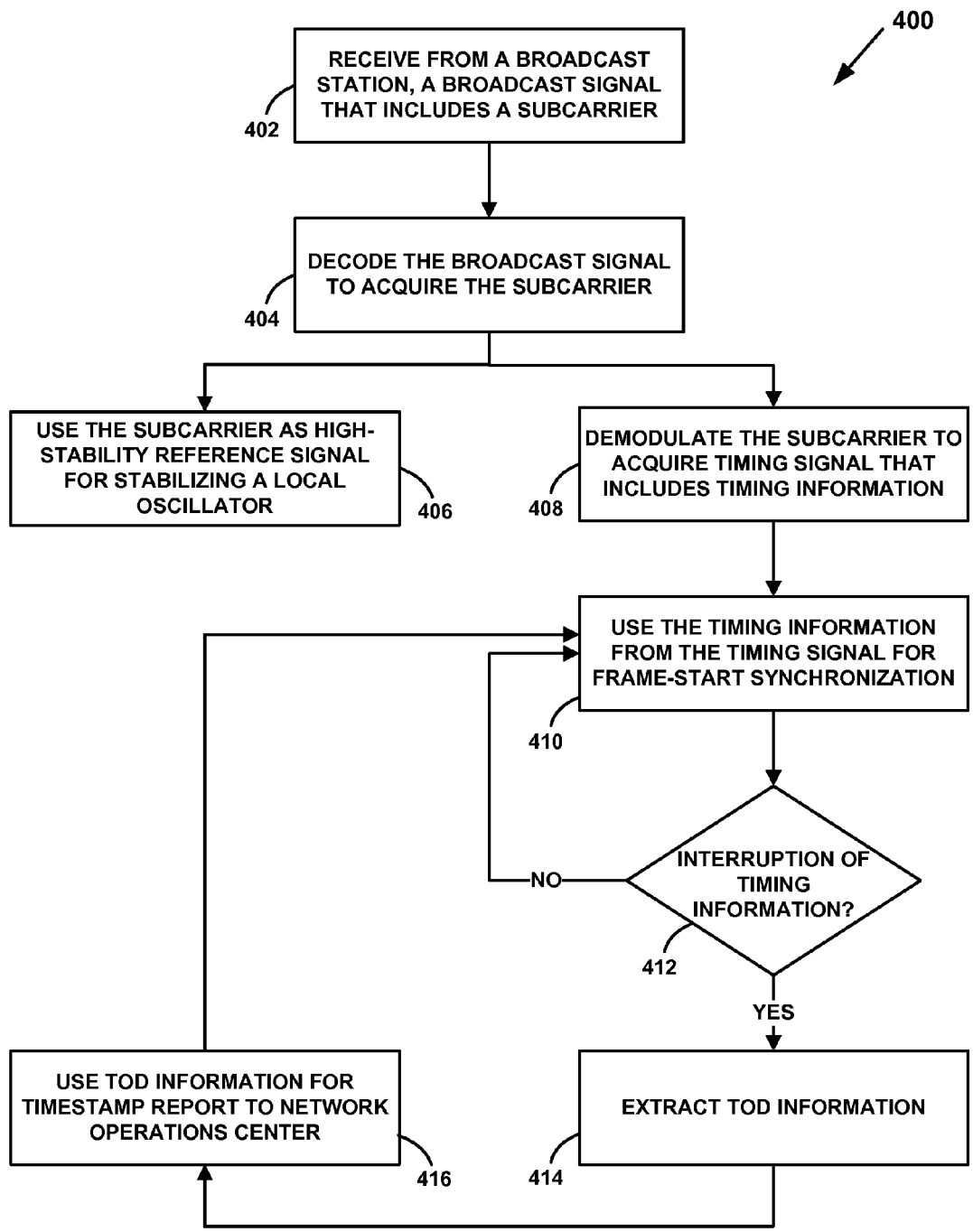
FIG. 4 is another flow chart illustrating a method, according to an exemplary embodiment.

FIG. 4 is another flow chart illustrating a method 400 according to an exemplary embodiment. The method is described by way of example as being carried out by a WiMAX base station. It should be understood that functions that are described by way of example as being carried out by a WiMAX base station, but may be carried out by any entity or entities that are configured to provide the described functionality, such as an LTE base station, without departing from the scope of the invention.

As shown, method 400 involves the base station receiving from a broadcast station, a broadcast signal that includes a subcarrier, as shown by block 402. The base station then decodes the broadcast signal to acquire the subcarrier, as shown by block 404. The base station then uses the subcarrier as a high-stability reference signal for stabilizing the BS's local oscillator, as shown by block 406. The subcarrier signal has been phase-locked to a GPS signal at the broadcast station, before being broadcast. Therefore, the base station can stabilize its local oscillator using the subcarrier, which alleviates the need for the base station to itself use a GPS signal for stabilization of its local oscillator.

In a further aspect of method 400, the base station may extract timing information from the subcarrier, which the base station may then use to synchronize the transmission of WiMAX frames with other nearby BSs. More specifically, the broadcast station may have modulated a timing signal onto the subcarrier, the therefore the base station may demodulate the subcarrier to acquire the timing signal, as shown by block 408. The base station may then use the timing information from the timing signal for frame-start synchronization, as shown by block 410. For example, the timing signal is preferably an FSK timing signal. As such, the base station may detect when transitions in the FSK timing signal occur. The base station may also determine a time-of-flight delay between itself and the broadcast station. Then, to implement frame-start synchronization with nearby BSs, the base station may detect each transition and then delay for a period of time to compensate for the time-of-flight delay before transmitting a next WiMAX frame.

In yet a further aspect of method 400, the base station may periodically acquire TOD information from the timing signal. In particular, as shown by block 412, the base station may periodically detect in the timing signal, an interruption in the timing information being provided via the timing signal, which indicates that TOD information will follow. Accordingly, the base station may then look for TOD information in the timing signal, rather than timing information, and extract the TOD information from the timing signal, as shown by block 414. The base station may then use the TOD information to send a report, which includes a timestamp, to the WiMAX Network Operations Center, as shown by block 416.

Further, it should be understood that when the base station detects an interruption in the timing information, the base station may continue processes for frame-start synchronization, using the last-received timing information. Then, once the TOD information has been extracted from the timing signal, the base station may resume looking for and using timing information from the timing signal for frame-start synchronization, as shown by block 410.

Figure 5A:
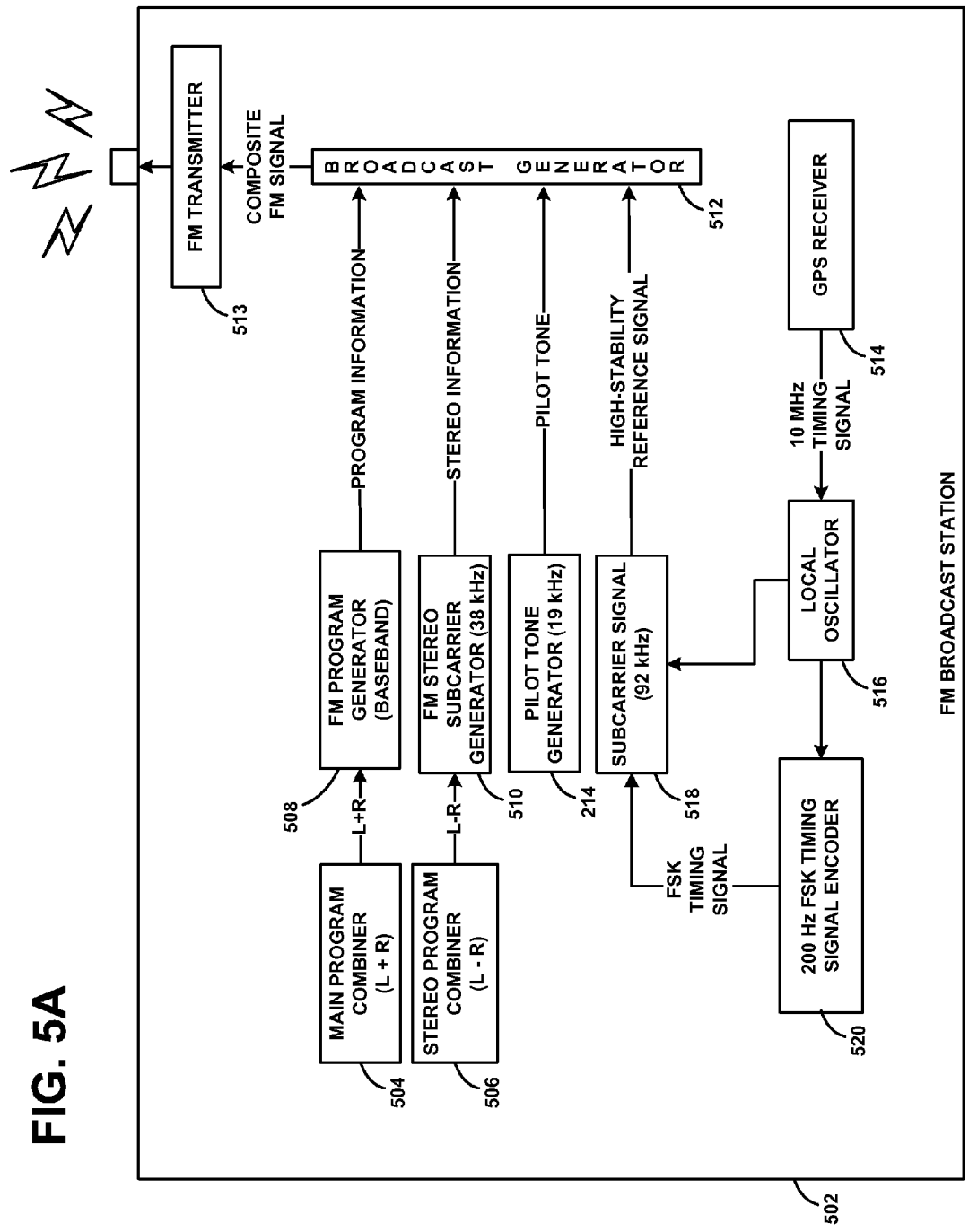
FIG. 5A is a block diagram illustrating an FM radio station, according to an exemplary embodiment.
Figure 5B:
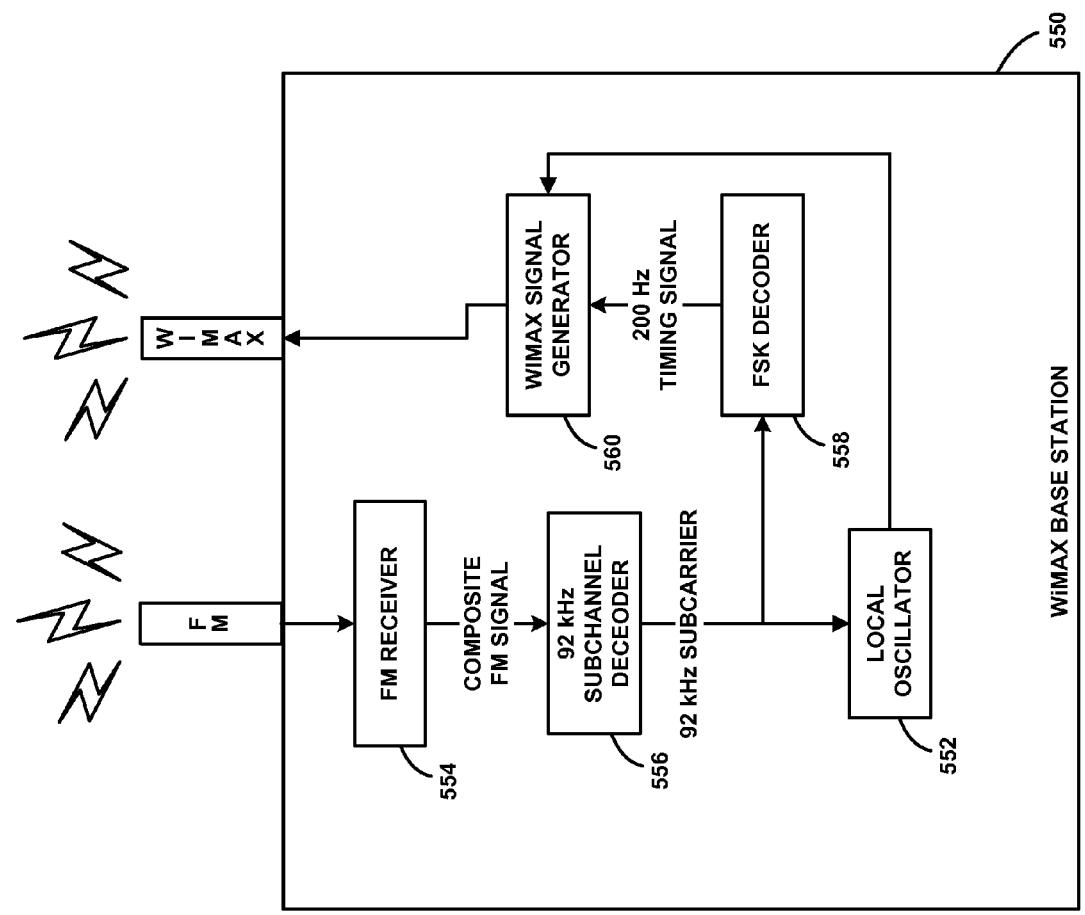
FIG. 5B is a block diagram illustrating a WiMAX base station, according to an exemplary embodiment.

FIGS. 5A and 5B are block diagram illustrating components of a communications system in which a subcarrier of an FM radio signal is used as a high-stability reference signal for local-oscillator stabilization at a WiMAX base station. In particular, FIG. 5A is a block diagram illustrating an exemplary FM radio station 502, which transmits a terrestrial broadcast signal that includes a 92 kHz subcarrier that is phase-locked to a GPS timing signal. FIG. 5B shows an exemplary WiMAX base station 550 that is configured to use the terrestrial broadcast signal as a high-stability reference signal, rather than using a GPS signal for this purpose.

As shown, the FM broadcast station 502 (also referred to herein as an "FM station") includes standard features for broadcasting an FM radio signal. Specifically, FM station 502 includes a main program combiner 504 and a stereo program combiner 506. Commercial FM broadcast stations normally transmit two channels of audio: Left (L) and Right (R). To do so requires a baseband signal and a subcarrier. When an FM signal is weak, however, only one signal can be recovered. As such, the main program combiner 504 creates the left and right audio in a single signal (L+R), which FM program information generator 508 then modulates onto a baseband frequency between 30 Hz and 15 kHz. The stereo program combiner then outputs a signal that is the right channel subtracted from the left channel (L-R), which FM Stereo Subcarrier generator 510 then modulates onto a 38 kHz subcarrier. Therefore, a receiver can recover the left and right channels by adding the baseband signal and the subcarrier (for the left channel) and subtracting the subcarrier from the baseband signal (for the right channel). And, if the signal is weak, and only the baseband signal is available, the receiver will not be able to recover stereo, but still receives all the audio information (i.e., L+R).

FM broadcast station 502 also includes a pilot tone generator, which generates a 19 kHz pilot tone. A receiving station can then detect the FM broadcast by listening for the 19 kHz pilot tone. A broadcast generator 512 then combines the baseband signal, the 19 kHz pilot tone, the 38 kHz subcarrier, and any other subcarriers to produce a composite FM signal, which modulates FM transmitter 513. Techniques such as the foregoing for FM broadcasting are well known in the art, and thus not described in greater detail herein.

The FM broadcast station 502 is also configured to include a 92 kHz subcarrier in the composite signal, which serves as a high-stability reference signal for WiMAX base stations. Accordingly, FM station 502 may include a GPS receiver 514 and a local oscillator 516, which may be used, along with a 92 kHz subcarrier generator 518, to provide a 92 kHz subcarrier which is highly stable and phase-locked to a GPS timing signal.

At FM broadcast station 502, GPS receiver 514 may function to provide a GPS coordinates (e.g., latitude and longitude), time-of-day (TOD) information, and/or a GPS timing signal, which typically takes the form of a 10 MHz frequency pulse. The GPS timing signal may be fed to the local oscillator 516, which is then phase-locked to the GPS timing signal. As such, 92 kHz subcarrier generator 518 may use local oscillator 516 to generate the 92 kHz subcarrier, thus substantially synchronizing the phase of the 92 kHz subcarrier with the phase of the GPS timing signal. As a result, the 92 kHz subcarrier provides a high-stability reference signal for WiMAX base stations.

In a further aspect, to provide WiMAX base stations with timing information for frame-start synchronization, FM broadcast station 502 also includes an FSK timing signal encoder 520 (also referred to herein as an "FSK encoder"). FSK encoder 520 is preferably configured to generate a 200 Hz FSK timing signal, which is preferably a binary FSK signal having transitions that occur at the same rate as WiMAX frames. As such, FSK timing signal may provide timing information that a WiMAX base station can use to achieve frame-start synchronization with nearby base stations. The FSK encoder 520 is also stabilized by the local oscillator 516, and thus phase-locked to the GPS timing signal provided by GPS receiver 514.

FSK encoder 520 may also be configured to output the 200 Hz FSK timing signal to the 92 kHz subcarrier generator 518. The subcarrier generator 518 can then modulate the 200 Hz FSK timing signal onto the 92 kHz subcarrier (or alternatively, the FSK timing signal encoder 520 may itself modulate the 200 Hz FSK timing signal onto the 92 kHz subcarrier). The broadcast generator 512 may then include the 92 kHZ subcarrier (with the 200 Hz FSK timing signal modulated thereon), along with the baseband signal, the 19 kHz pilot tone, and the 38 kHz subcarrier, in the composite FM signal.

In a further aspect, to provide WiMAX base stations with the TOD information they would otherwise obtain from their own GPS receivers, FSK timing signal encoder 520 may be configured to embed the time-of-day (TOD) information from GPS receiver 514 in the FSK timing signal. For instance, the FSK timing signal encoder 520 may periodically interrupt the timing information being encoded into the 200 Hz FSK timing signal, wait a predetermined period of time (to signal to base station 550 that TOD information will follow), and then modulate the TOD information onto the 92 kHz subcarrier (or output the TOD information to the 92 kHz subcarrier generator 518, which can then modulate the TOD information onto the 92 kHz subcarrier). In either scenario, after inserting the TOD information, the FSK timing signal encoder 520 typically resumes encoding timing information in the 200 Hz FSK timing signal.

Referring now to base station 550, it typically includes components for providing WiMAX service, such as those described in reference to base station 250 of FIG. 2 and those that are generally known to those skilled in the art. Base station 550 is also configured to decode the composite FM signal broadcast from FM transmitter 513, and use the 92 kHz subcarrier as high-stability reference signal with which to stabilize its local oscillator 552. As such, base station 550 includes an FM receiver 554 configured to receive the composite FM signal, and a sub-channel decoder 556 that is configured to extract the 92 kHz subcarrier from the received FM signal. The local oscillator 552 may then be phase-locked to the 92 kHz subcarrier once extracted.

Further, base station 550 may include an FSK decoder 558, which is configured to demodulate the 92 kHz subcarrier in order to acquire the 200 Hz FSK timing signal. More specifically, the FSK decoder 558 receives the 92 kHz subcarrier from the sub-channel decoder 556, and demodulates the 92 kHz subcarrier to extract the 200 Hz timing signal. The timing information provided by the 200 Hz timing signal may then be used by WiMAX signal generator 560 for frame-start synchronization. For instance, as described herein, the base station 550 may implement a time advance, which is equal to the time-of-flight delay between base station 550 and FM station 502, from each transition in the FSK timing signal. As such, when the base station 550 detects a transition, it may wait for a period of time to compensate for the time-of-flight delay, and then initiate the transmission of the next WiMAX frame.

In a further aspect, WiMAX base station 550 may be configured to extract TOD information from the 200 Hz FSK timing signal, as explained herein. Also as explained herein, WiMAX base station 550 may be pre-programmed or configured to determine its location and/or calculate time-of-flight delay to broadcast station 502, without relying on a GPS signal. A WiMAX base station that is configured as such, and is configured to use the subcarrier as a high-stability reference signal, may be fully operational without any use of GPS, as all functions for which a GPS signal would otherwise be used (e.g., local-oscillator stabilization, frame-start synchronization, obtaining TOD information, and/or location determination), are supported without use of a GPS. However, it should be understood that in some embodiments, WiMAX base station 550 may use the subcarrier as a high-stability reference signal, but still use GPS for other purposes (or possibly even purposes overlapping those for which the subcarrier is used).

II. Other Techniques for Replacing GPS or GPS Backup

The following section describes examples of other techniques that allow for base-station functions that typically rely on GPS, to be provided without relying on GPS. Such techniques may be implemented in addition, or in the alternative, to the techniques described above, which may rely upon timing and other information being provided via a subcarrier of a terrestrial broadcast signal, such as an FM radio signal.

Figure 6:
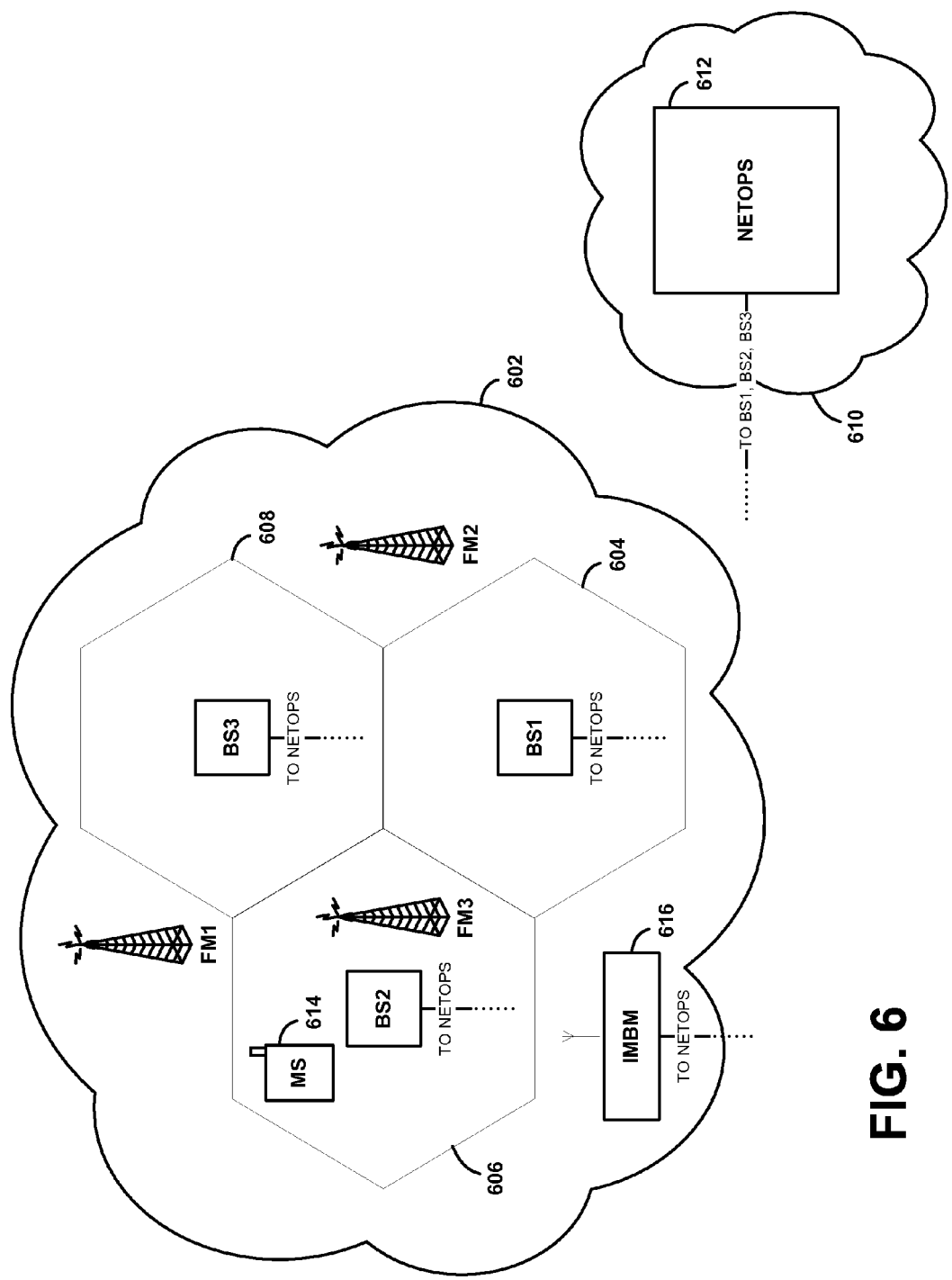
FIG. 6 is a block diagram illustrating a telecommunications market, in which an exemplary embodiment may be implemented.

FIG. 6 is a block diagram illustrating a telecommunications market 602, in which an exemplary embodiment may be implemented. A "telecommunications market" may be a defined geographic area that is served by a given set of FM radio stations. For example, a telecommunications market may be a geographic area such as a city, county, state, or portions thereof, which is served by a common set of FM radio stations. Alternatively, a telecommunications market may include multiple cities, multiple counties, or multiple states, which are all served by a common set of FM radio stations. As shown, telecommunications market 602 includes a number of FM radio stations FM1, FM2, and FM3. Each of these FM stations broadcasts an FM radio signal that can generally be received throughout the telecommunications market 602.

As further shown, a macro-network is configured to provide wireless communication service in a coverage area that overlaps with at least a portion of telecommunications market 602. In particular, a number of macro-network base stations BS1, BS2, and BS3 provide service in their respective coverage areas 604 to 608, which are each located within telecommunications market 602. It should be understood that the coverage area of a macro network is defined by the broadcast range of the base station in the macro network, and that the geographic area of a telecommunications market is defined by the broadcast range of a set of FM radio stations. Thus, while the coverage area of a macro network and a telecommunications market may overlap, as in FIG. 6, these geographic areas are defined independently from one another. To provide wireless service, each macro-network base station BS1 to BS3 is communicatively coupled to a service provider's core network 610, which includes a Network Operations Center (NetOps) 612. Among other functions, NetOps 612 may be configured to coordinate the operation of base stations in the macro network, so that substantially contiguous wireless service can be provided throughout the coverage area of the macro network. Each macro-network base station BS1-BS3 is typically configured to engage in wired (e.g. Ethernet) and/or fiber optic and/or microwave communications with NetOps 612 via a backhaul connection to the service provider's core network 610. Alternatively, a macro-network base station may communicate with NetOps 612 via a packet-data network such as the Internet.

In the illustrated arrangement, base station BS1 is a standard macro-network base station, which includes a GPS interface, and relies on a GPS signal for various functions. In particular, base station BS1 may use GPS to (i) determine its geographic location, (ii) stabilize its local oscillator, and (iii) synchronize frame transmissions with nearby macro-network base stations. As such, frame transmissions by base station BS1 may be edge-triggered to a 1 pulse per second (pps) GPS timing signal. Further, since GPS provides a highly-accurate 10.23 MHz signal that is traceable to a stratum 1 atomic clock, base station BS1 may use this 10.23 MHz signal as a reference signal stabilizing its local oscillator and frame-start synchronization with nearby macro base stations.

Macro base station BS2, on the other hand, is configured to operate according to an exemplary embodiment, and as such, is configured to provide high-speed wireless data service (e.g., under WiMAX or LTE) without receipt of a GPS signal. To do so, base station BS2 may be configured to perform an initial setup routine in which base station BS2 determines its geographic location, calibrates its local oscillator, and synchronizes its frame-start timing with nearby macro base stations BS1 and/or BS3, all without receiving a GPS signal. Furthermore, after carrying out the initial setup routine, base station BS2 preferably switches to an operating mode in order to provide wireless data service in coverage area 606. While in operating mode, base station BS2 preferably continues to stabilize its local oscillator and synchronize frame transmissions without receiving a GPS signal.

A. Exemplary Macro-Network Base Station

Figure 7:
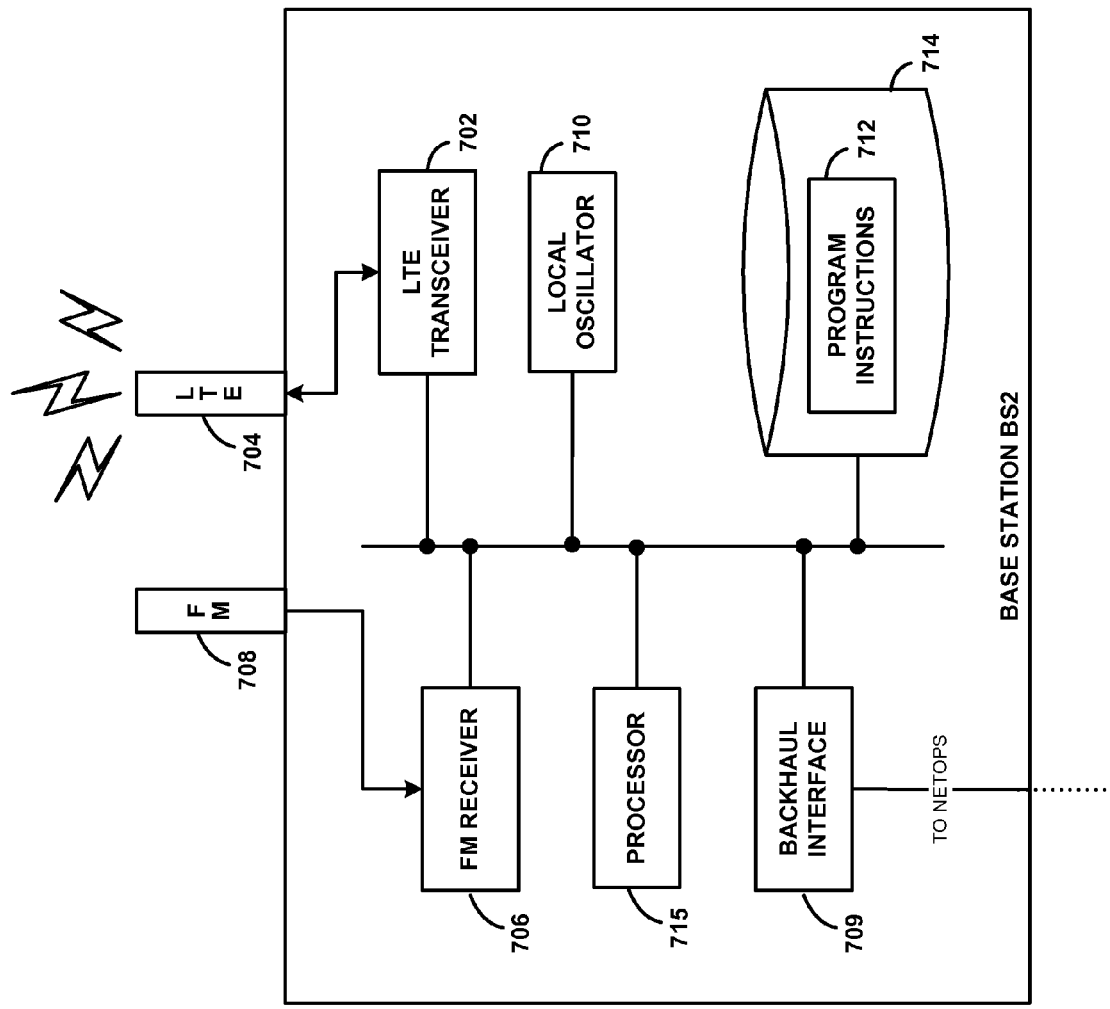
FIG. 7 is a block diagram illustrating a base station, according to an exemplary embodiment.

FIG. 7 is a simplified block diagram illustrating exemplary base station BS2 in greater detail. Note that a base station may combine some or all of the components shown in FIG. 7 and FIG. 5B, in order to combine some or all of the functionality described in reference to FIG. 7 and FIG. 5B.

As shown in FIG. 7, base station BS2 includes a LTE transceiver 702 and an associated antenna 704 for providing LTE service, as well as a separate FM receiver 706 and an associated antenna 708 for receiving FM radio signals. Further, base station BS2 includes a backhaul interface 709 for communicating with the service provider's core network (and entities therein, such as NetOps 612). Base station BS2 also includes a local oscillator 710, and program instructions 712 stored on a computer-readable medium 714 (i.e., data storage) that are executable by at least one processor 715 to carry out the base-station functionality described herein.

As noted, base station BS2 is configured to carry out a setup routine. During the setup routine, base station BS2 preferably synchronizes its frame transmissions with nearby base station BS1. By synchronizing its frame-start timing with base station BS1, which is already synchronized with other nearby base stations, base station BS2 will effectively synchronize its frame-start timing with the other nearby base stations as well.

In an exemplary embodiment, base station BS2 is configured to synchronize with base station BS1 by initially tuning to the broadcast signal from base station BS1, and then generating a frame-start timing signal that is synchronized with the frames in the broadcast signal from BS1. In particular, the frame-start timing signal may include periodic frame-start triggers that are aligned with the receipt of the preambles in frames of the broadcast signal. Once generated as such, the phase of the periodic frame-start triggers is aligned with the receipt of the frames at base station BS2. However, to synchronize frame-start timing with base station BS1, base station BS2 needs to align the phase of the frame-start triggers with the transmission of frames by base station BS1. Accordingly, base station BS2 may determine the time-of-flight delay between base station BS1 and base station BS2, and adjust the phase of the frame-start timing signal to account for the time-of-flight delay, thereby synchronizing the frame-start triggers with the transmission of frames by base station BS1.

In order to calculate the time-of-flight delay, base station BS2 needs to determine its own location so that the distance between it and base station BS1 can be determined. Accordingly, during the setup routine, base station BS2 may also be configured to determine its location without relying upon receipt of a GPS signal. In an exemplary embodiment, to determine its location without GPS, base station BS2 may coordinate with NetOps 612. For example, base station BS2 may determine an angle-of-arrival (AoA) at base station BS2 for each FM station FM1 to FM3 (i.e., the angle-of-arrival of the signal broadcast by the respective FM station), and then report this angle-of-arrival data to NetOps 612. NetOps 612 is preferably configured to use this information to determine the geographic location of base station BS2. As such, once base station BS2 sends NetOps 612 the angle-of-arrival information for nearby FM stations FM1-FM3, NetOps 612 may provide base station BS2 with its geographic location.

Furthermore, in order to generate a stable frame-start timing signal that can be relied upon for frame-start synchronization, base station BS2 needs a highly stable local oscillator 710. Accordingly, during the setup routine, base station BS2 is preferably configured to stabilize its local oscillator using an FM radio signal as a reference, rather than a GPS signal. For example, base station BS2 may stabilize its local oscillator 710 by phase-locking its local oscillator to an FM signal from an FM station, such as the FM signal broadcast by one of FM stations FM1, FM2, and FM3.

In a further aspect, after base station BS2 ends the setup routine and switches to operating mode, base station BS2 preferably continues to stabilize its local oscillator 710 using the FM signal. As noted above, base station BS2 includes an FM receiver 706 in addition to its LTE interface (i.e., transceiver 702 and antenna 704). Therefore, once base station BS2 switches to operating mode and begins using its LTE interface to provide service in coverage area 606, base station BS2 can continue to receive and use an FM radio signal as a reference signal for local-oscillator stabilization.

Importantly, the phase drift of FM radio signals is such that if an FM radio signal was used for local oscillator stabilization and phase drift was not accounted for, the local oscillator 710 would likely fail to meet FCC requirements. Therefore, base station BS2 is preferably configured to adjust its local oscillator periodically in order to account for phase drift of the FM radio signal. To do so, base station BS2 may periodically receive phase-error information from NetOps, which indicates phase error of the FM signal that base station BS2 is using to stabilize its local oscillator 710.

In a further aspect, an exemplary base station BS2 may periodically (e.g., once a week or once a month) shut down and repeat the calibration/setup process. A service provider may deem periodic shutdown to repeat the setup routine appropriate to help prevent the stability of the local oscillator from becoming unacceptable and/or to help prevent frame-start timing from becoming out of sync with nearby base stations. A service provider may also implement a periodic shutdown and repetition of the setup routine for other reasons, without departing from the scope of the invention.

Configured as described above, an exemplary macro-network base station BS2 is able to: (i) determine its geographic location, (ii) stabilize its local oscillator 710, and (iii) synchronize its frame-start timing with nearby macro-network base stations, without receipt of a GPS signal. It should be understood, however, that it is within the scope of the invention that a base station use a GPS signal for some of this functionality.

B. Exemplary In-Market Broadcast Monitor

Again referring to FIG. 6, NetOps 612 is preferably configured to provide macro-network base stations with phase-error information for FM stations in their respective telecommunications markets. In order that NetOps 612 can provide phase-error information for the FM stations in various telecommunications markets, a service provider may install an in-market broadcast monitor (IMBM) in each telecommunications market 602. An exemplary IMBM may be configured to receive FM radio signals from FM stations in the market in which the IMBM is located, and to periodically determine the phase errors of the FM radio signals. The IMBM may then report the determined phase errors to NetOps, so that NetOps in turn may provide phase-error information to base stations that are using the FM radio signals as references for local oscillator stabilization. For example, IMBM 616 is installed in telecommunications market 602, and is preferably configured to receive FM radio signals from stations FM1-FM3, to generate phase-error information for each of the corresponding FM radio signals, and to periodically send the phase-error information to Netops 612.

Figure 8:
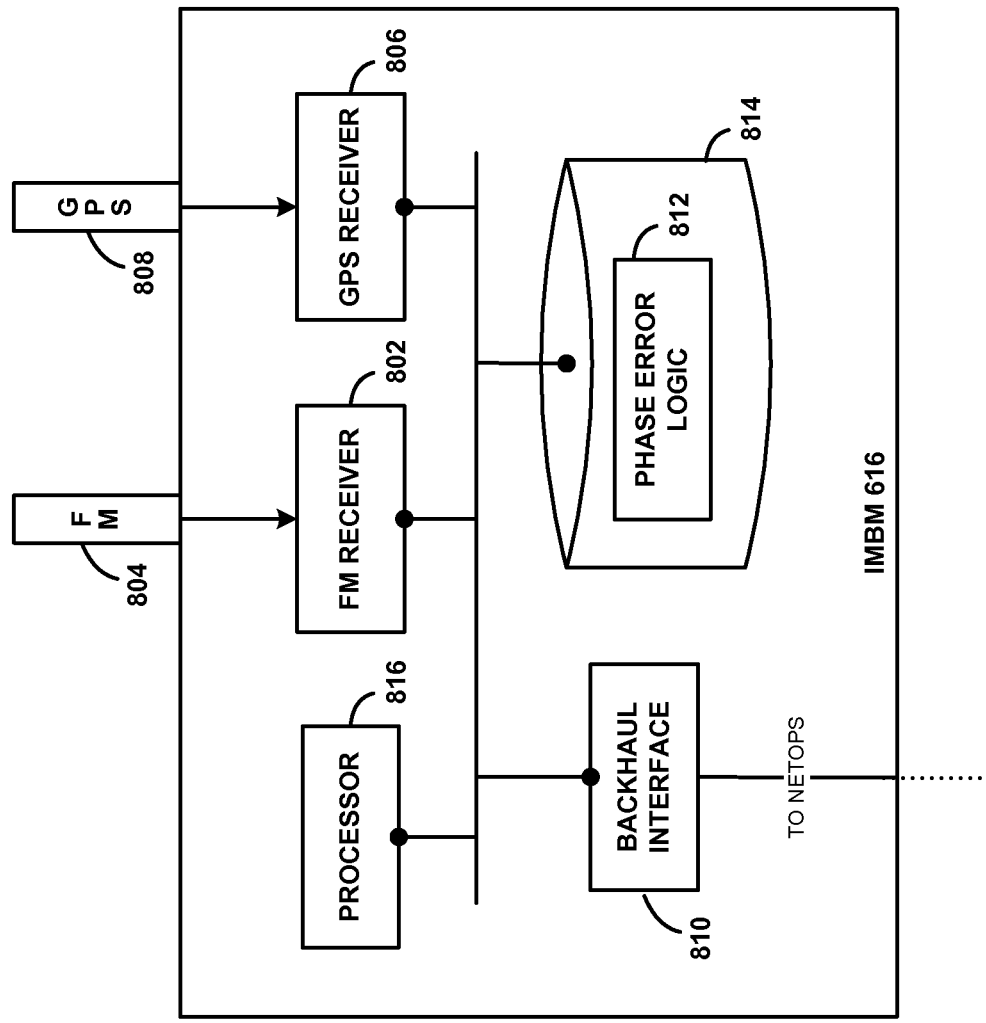
FIG. 8 is a block diagram illustrating an in-market broadcast monitor, according to an exemplary embodiment.

FIG. 8 is a simplified block diagram illustrating IMBM 616 in greater detail. To determine phase-error information for the FM radio signals in telecommunications market 602, IMBM 616 may include one or more FM receivers 802 (and one or more corresponding antennas 804) for receiving the FM radio signals that are broadcast by FM stations FM1 to FM3. Further, IMBM 616 includes a GPS receiver 806 (and corresponding antenna 808), as well as a backhaul interface 810 for communicating with NetOps 612 (and possibly with other entities on the service provider's core network 610 as well).

In an exemplary embodiment, IMBM 616 is preferably installed in a location where line-of-sight communication with a GPS satellite is possible. The IMBM 616 may then use the 10.23 MHz signal that GPS provides as a stable reference signal for determining phase error in FM radio signals. In particular, the IMBM 616 may generate a comparison signal by dividing down each FM radio signal in telecommunications market 602 such that when the actual frequency of the FM radio signal is equal to the listed or identified frequency of the broadcasting FM station, the frequency of the comparison signal will be 10.23 MHz. IMBM 616 may then determine the phase difference between the comparison signal and the stable GPS 10.23 MHz signal that is known to be accurate, and determines the phase error of the FM signal therefrom. Accordingly, the IMBM 616 may include phase-error logic 812 (i.e., program instructions), which is stored on a computer-readable medium 814 (i.e., data storage), and executable by at least one processor 816 to determine phase-error information for received FM radio signals. Furthermore, IMBM 616 may also include program instructions not explicitly shown, which are stored on a computer-readable medium and executable to carry out functions described herein.

As noted, IMBM 616 may be configured to provide phase-error information for multiple FM stations in a given market. To do so, an IMBM may be equipped with a separate antenna to receive each FM station in its telecommunications market, so that the IMBM can determine phase-error information for all stations in the market simultaneously. Alternatively, the IMBM may determine phase-error information for one FM station at a time, and periodically cycle through all the FM stations that it monitors. In such an embodiment, it is possible that the IMBM may include one or more FM antennas. And as another alternative, an IMBM may group the FM stations it monitors into a number of subsets and cycle through the subsets, determining phase-error information for all stations in a given subset simultaneously. For example, an IMBM monitoring nine FM stations in a given market may be equipped with three FM antennas, and accordingly, may divide the nine FM stations into three subsets of three FM stations each. The IMBM may then determine phase-error information for the three FM stations in a given subset simultaneously, and cycle between the three subsets. Other IMBM configurations for monitoring multiple FM stations in a given market are also possible.

C. Exemplary Network Operations Center

Figure 9:
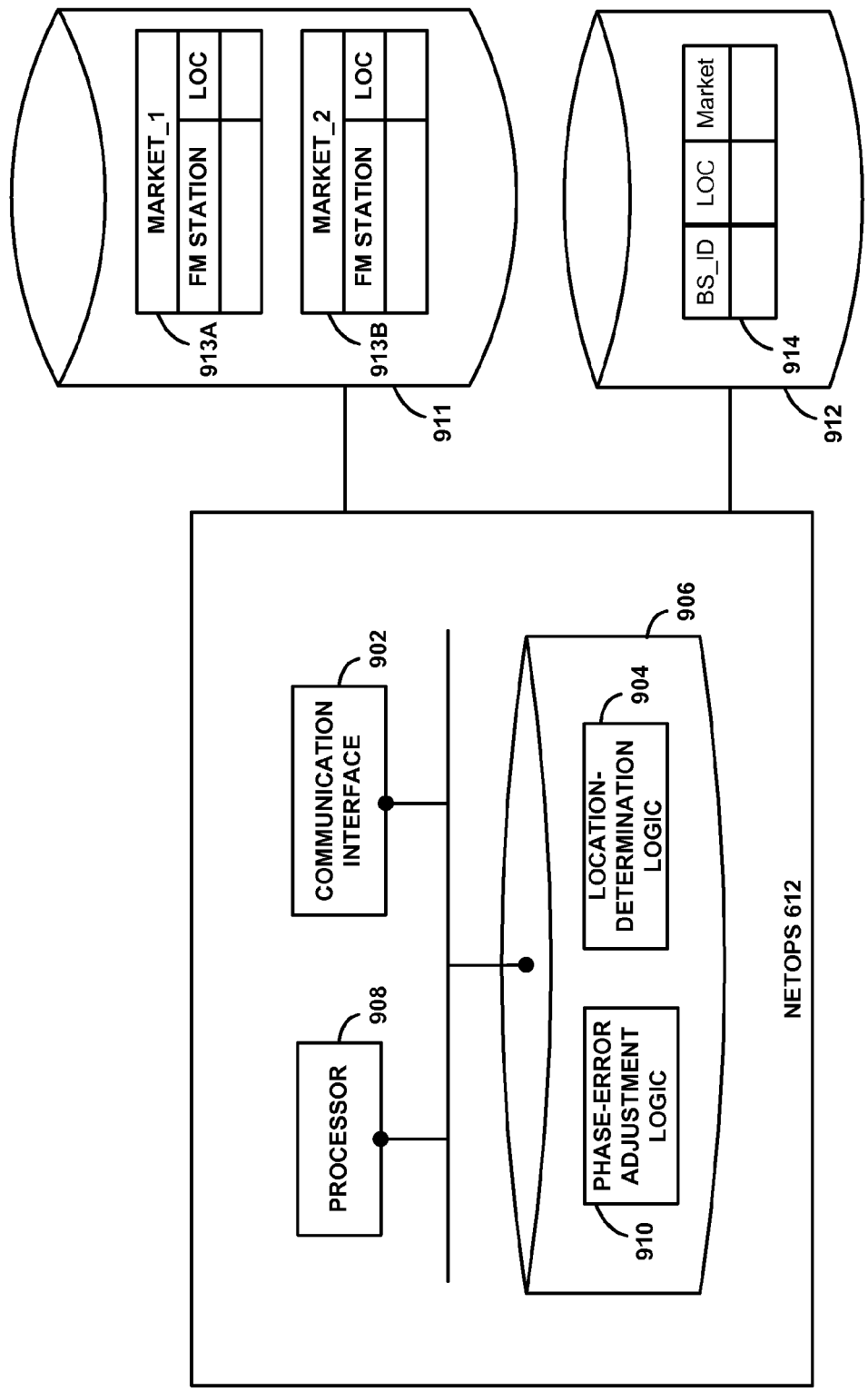
FIG. 9 is a block diagram illustrating a network operations center, according to an exemplary embodiment.

FIG. 9 is a simplified block diagram illustrating NetOps 612 in greater detail. According to an exemplary embodiment, NetOps 612 may be configured to facilitate the operation of a base-station that does not receive a GPS signal. NetOps 612 may accordingly assist base station BS2 in various functions that might otherwise require that base station BS2 receive a GPS signal. For example, NetOps may assist base station BS2 in location determination, local-oscillator stabilization, and/or frame-start synchronization.

As shown, NetOps 612 includes a communication interface 902 via which NetOps 612 communicates with IMBM 616 and base stations BS1-BS3. While only one communication interface is shown, it should be understood that NetOps may alternatively include separate communication interfaces for communicating with IMBM 616 and base stations BS1 to BS3.

In addition, NetOps 612 includes location-determination logic 904 (i.e., program instructions), which is stored on a computer-readable medium 906 (i.e., data storage), and executable by at least one processor 908 to determine the location of the base station. More specifically, to facilitate location determination by base station BS2, NetOps 612 may be configured to receive angle-of-arrival data from base station BS2, which provides the angle-of-arrival at base station BS2 for various FM radio signals in the market in which base station BS2 is located. NetOps 612 may then use the angle-of-arrival data to determine the location of base station BS2. In particular, NetOps may be configured to use the angle-of-arrival data and the locations of the FM stations from which the FM radio signals originated to perform a triangulation-based location determination technique.

To facilitate determining the locations of various FM stations, NetOps may include or have access to a database 911 that stores FM-station location data on a per-market basis. In particular, database 911 may include a table for each of a plurality of telecommunications markets, with the table for a given market indicating the location of each FM station in the market. For instance, database 911 includes table 913A, which provides the location (LOC) of each FM station in Market_1, and table 913B, which provides the location (LOC) of each FM station in Market_2. Tables 913A and 913B may identify an FM station using various identifiers, such as the broadcast frequency or the call letters of the FM station.

NetOps 612 also includes phase-error adjustment logic 910, which is executable to: (a) acquire phase-error information for the FM stations in a given market from the IMBM 616 in that market, and (b) distribute FM-signal phase-error information to the appropriate base stations. Furthermore, NetOps 612 may also include program instructions not explicitly shown, which are stored on a computer-readable medium and executable to carry out functions described herein.

To facilitate sending periodic phase-error indications to the appropriate base stations, NetOps 612 may include or have access to a database 912 that indicates which base stations are relying on which FM stations for local-oscillator stabilization. In order that this database be populated, when a base station selects an FM radio signal to use for local oscillator stabilization, the base station preferably reports the FM station that broadcasts the FM radio signal to NetOps 612, along with its own base station identifier (BS_ID). The FM station may be identified by the base station using various techniques. For instance, the base station may indicate the broadcast frequency (e.g., 99.1 MHz) or the call letters of the FM station. NetOps then stores this information in database 912 so that it can later determine the FM station that the base station is relying upon. More specifically, NetOps 612 may create an entry in the database 912 for the market in which the base station is located, which associates the BS_ID of the base station with the FM station.

Provided with database 912, NetOps 612 may determine which mobile stations to send phase-error indications to whenever NetOps 612 receives updated phase-error information from IMBM 616. In particular, when NetOps 612 receives updated phase-error information for a certain FM station, NetOps 612 may access the database 912, and determine which base station or base stations in the market are using that FM station for local oscillator stabilization. For example, if NetOps receives an indication that the FM station with a 99.1 MHz broadcast frequency in a certain market has a certain phase error, then NetOps may then access the database to determine the base station or base stations which are relying upon the 99.1 MHz FM radio signal for local oscillator stabilization, and send these base stations the phase-error information for the associated FM station.

D. Additional Location-Determination Methods

Many location-determination techniques, such as time difference of arrival (TDOA) and various triangulation-based techniques are based upon the angles-of-arrival of multiple signals from known sources. These techniques typically involve determining the location of a receiving entity by measuring the angles at which signals arrive at the receiving entity from at least three known sources, and then subtending from the sources at the measured angles to determine a crossing point. This crossing point is thus the location of the receiving entity. In an exemplary embodiment, the location of a macro-network base station is determined using a location-determination technique based at least in part on the angles-of-arrival of FM signals from nearby FM radio stations.

Unfortunately, when a macro-network base station is initially installed, the base station does not know the locations of FM stations in the market in which it is located, and angle-of-arrival techniques typically require that the locations of the signal sources be known. Complicating this problem, FM stations are typically identified by their broadcast frequency, and broadcast frequencies are reused from market to market. This may make it difficult to determine which market a given FM station is located within, which in turn makes determining the geographic location of the FM station, as simply looking up the location of an FM station having a certain broadcast frequency may yield inconclusive results. However, in an exemplary embodiment, an LTE or WiMAX base station coordinates with NetOps to intelligently determine the respective locations of FM stations in its market, so that the angle-of-arrival-based techniques can be applied to determine the base station's location.

Figure 10A:
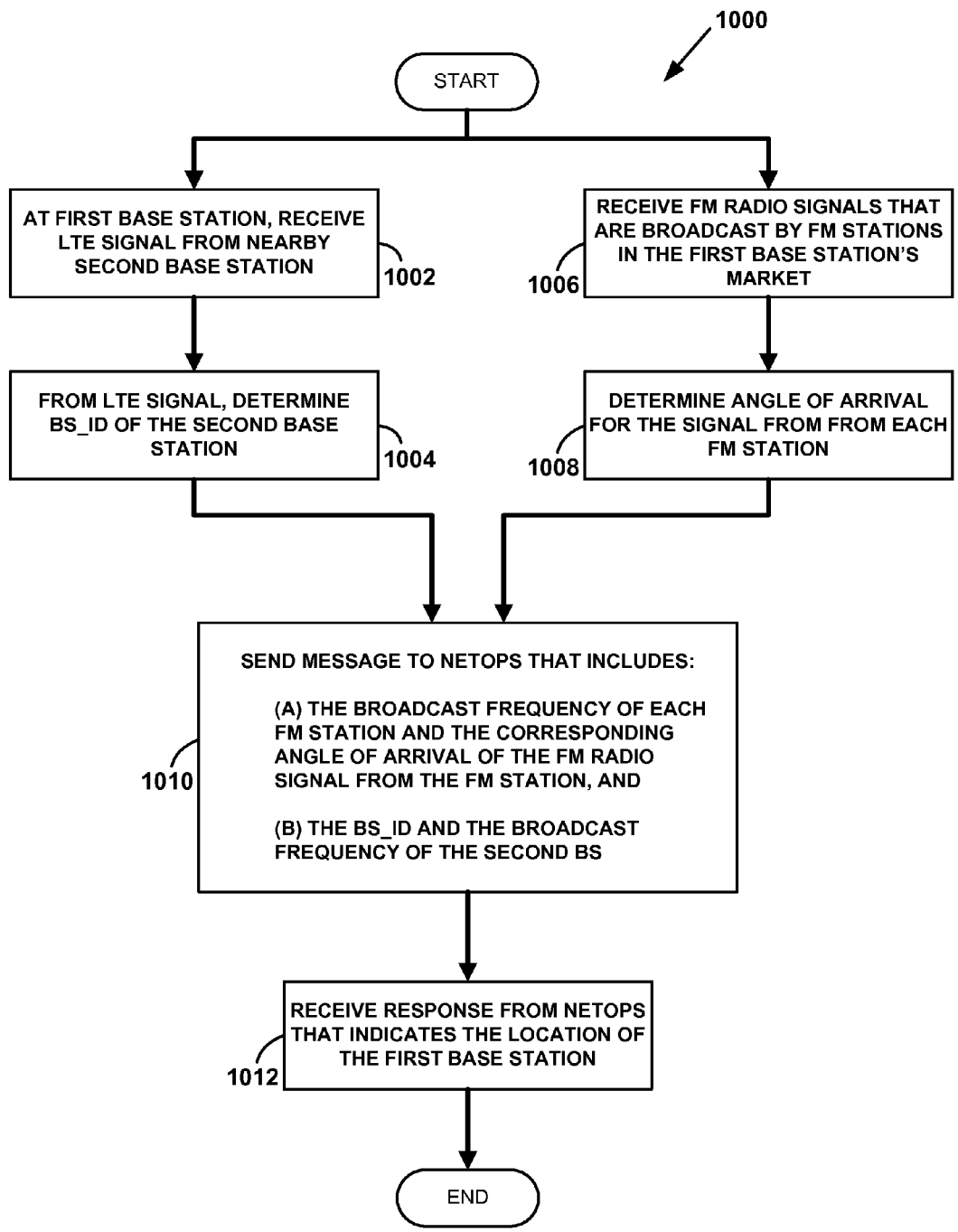
FIG. 10A is a flow chart illustrating a location-determination method that may be carried out by a macro-network base station, according to an exemplary embodiment.

FIG. 10A is a flow chart illustrating a location-determination method 1000 that may be carried out by a macro-network base station, according to an exemplary embodiment. In particular, method 1000 may involve a first base station searching for and receiving a broadcast signal from a second base station that is nearby, as shown by block 1002. As a macro-network base station typically includes its BS_ID as overhead information in its broadcast signal (e.g., as overhead information in each LTE or WiMAX frame), the first base station may extract the BS_ID of the second base station from the received broadcast signal, as shown by block 1004. Additionally, the first base station may receive FM radio signals (preferably three or more) that are broadcast by a number FM stations in the first BS's market, as shown by block 1006. The first base station may then determine the angle of arrival of each FM signal, as shown by block 1008.

Once the first base station has determined the identification information for the second base station, the first base station may send a message to NetOps that indicates: (a) the broadcast frequency of each FM station and the corresponding angle of arrival of the FM radio signal from the FM station, and (b) the BS_ID and the broadcast frequency of the second base station, as shown by block 1010. The first base station then receives a response from NetOps that indicates its location, as shown by block 1012, which NetOps has determined based upon the information provided by the first base station (e.g., the broadcast frequency and angle of arrival of each of the FM stations and/or the BS_ID and the transmission frequency of the second base station).

To carry out an exemplary method, a base station may be configured to determine the angle-of-arrival for a given FM station using various techniques, which are generally known in the art. For example, a base station may be configured to use a well-known Doppler technique in which the base station's local oscillator is offset from the incoming FM signal, and beats against the FM signal to produce an audio "beat note". The base station's FM antenna is electronically "swept" toward and away from the signal source, causing the pitch of the audio "beat note" to rise and fall. In a manner that is well known to those skilled in the art, a zero-crossing detector is then phase-synchronized with an angle "stepper" to provide the angle at which the signal is arriving at the base station. Other angle-of-arrival techniques may also be employed, without departing from the scope of the invention.

As noted, the first base station may report the BS_ID and/or the broadcast frequency of the second base station to assist NetOps in determining the market in which the base station is located. In particular, by looking up the market or markets that have a macro-network base station with the reported BS_ID and/or the reported broadcast frequency, NetOps may narrow the markets in which it searches for a match with the reported FM stations. To do so, NetOps may search for markets that have all the FM stations reported by the base station. Since FM broadcast frequencies may be reused from market to market, this search can return a number of markets. Accordingly, NetOps may narrow the markets that it searches to those that also have a macro-network base station with the reported BS_ID and/or the reported broadcast frequency.

In an alternative location-determination method, a macro-network base station may still provide NetOps with angle-of arrival data for FM stations in its market, but may not provide the identification information for a nearby base station. In such an embodiment, the base station need not search for or receive the broadcast signal from a nearby macro-network base station. Therefore, the base station may simply receive three or more FM radio signals in its market, and send a message to NetOps that identifies the broadcast frequency of each FM radio signal, along with the corresponding angle of arrival of the FM radio signal. As NetOps does not narrow the potential markets to those having a matching base station, it is possible that not identifying the nearby base station may result in more processing by NetOps. However, NetOps can still use the angle-of-arrival information to determine the location of the base station.

As noted, NetOps is preferably configured to perform an angle-of-arrival-based location determination technique (i.e., a triangulation-based technique) to determine the location of a given base station. The location determination technique used by NetOps is preferably based upon the locations of the FM stations and the corresponding angle-of-arrival of each FM station's signal at the macro-network base station. In a further aspect, the location determination technique used by NetOps may also be based upon the location of a base station that is nearby the base station for which location is being determined.

In an exemplary embodiment, NetOps receives angle-of-arrival data from a base station, which preferably includes angles of arrival for at least three FM radio signals. NetOps also receives identification information for each of these FM radio signals (e.g., a listed frequency of or call letters of the FM station that broadcasts the FM radio signal). Furthermore, NetOps may receive identification information for a nearby base station (e.g., the BS_ID and/or broadcast frequency of the information). Due to re-use of the identification information for both macro-network base stations and FM radio stations, the reported identification information by itself may be insufficient to uniquely identify the telecommunications market in which the reporting base station is located, and thus insufficient to determine the location of the reporting base station.

Accordingly, NetOps may initially identify a set of potential markets in which a base station might be located. To do so, NetOps preferably determines which markets include FM stations at all the broadcast frequencies reported by the second base station. Since it is possible that a large number of potential markets may still exist even after narrowing the set to those markets that include all the FM stations identified by the base station, NetOps may be further configured to use the reported information regarding the nearby base station (e.g., the BS_ID and the broadcast frequency) to further narrow the potential markets to those that also include a base station that is assigned the reported BS_ID, and/or that operates at the reported broadcast frequency.

It should be understood that the order in which the identification information for the FM stations and the identification information for the nearby base station are used to narrow the set of potential markets may vary as a matter of engineering design choice. Therefore, in an alternative embodiment, NetOps may first narrow the set of potential markets to those in which a base station matches the reported BS_ID and broadcast frequency, and then further narrow the set to those potential markets that have all the reported FM stations.

Figure 10B:
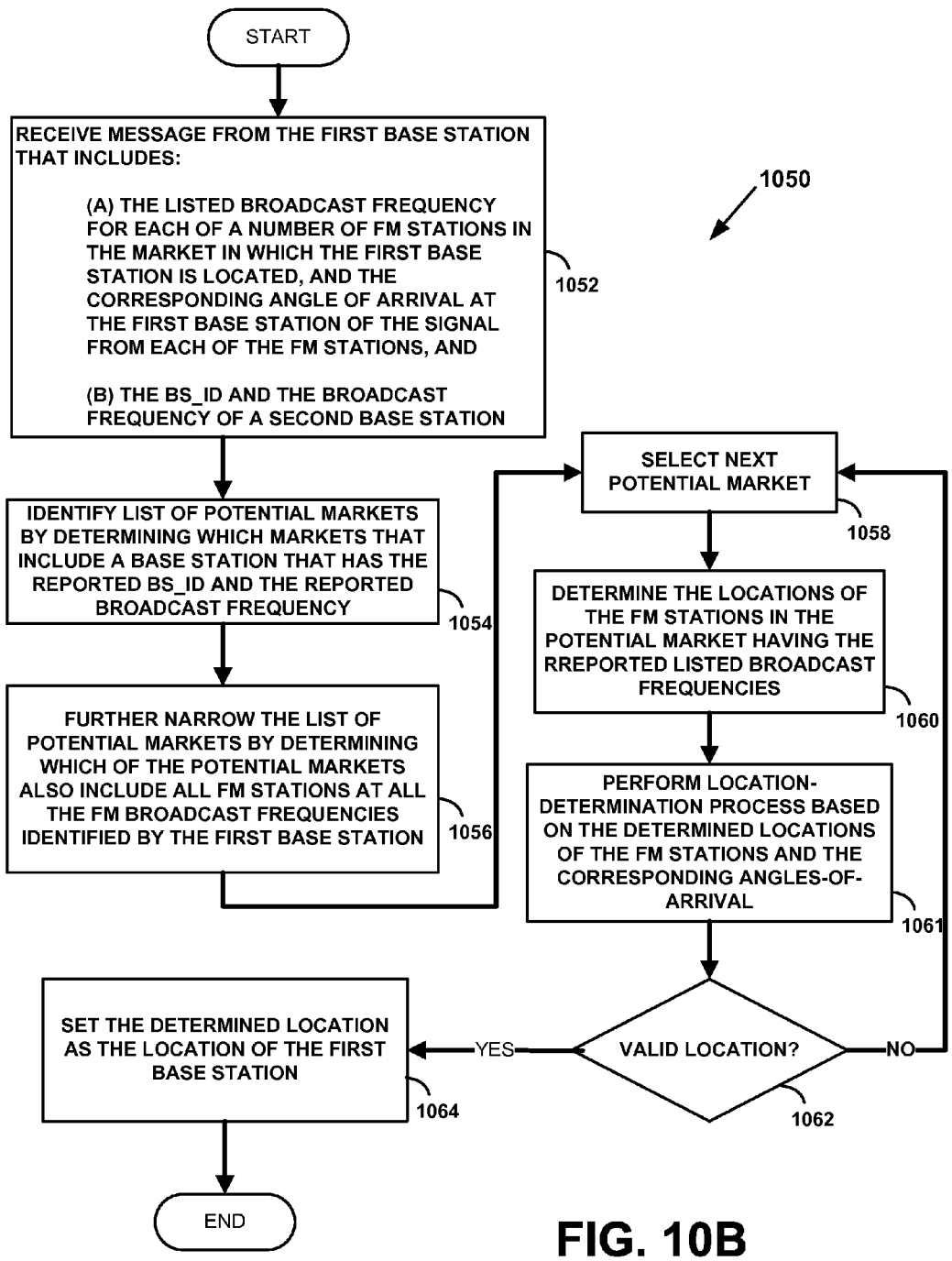
FIG. 10B is a flow chart illustrating an exemplary method that may be carried out by a network operations center to determine the location of a macro-network base station, according to an exemplary embodiment.

FIG. 10B is a flow chart illustrating an exemplary method 1050, which may be carried out by NetOps to determine the location of a macro-network base station. In particular, NetOps receives a message from the base station that includes: (a) the listed broadcast frequency for each of a number of FM stations (preferably three or more) in the market in which the second base station is located, as well as the corresponding angles of arrival at the second base station for the FM radio signal from each FM stations, and (b) the BS_ID and the broadcast frequency of a second BS, as shown by block 1052. NetOps then identifies a subset of all markets as potential markets, by determining which markets include a base station that has the reported BS_ID and is operating at the reported transmission frequency, and eliminating from consideration the markets that do not, as shown by block 1054. NetOps further narrows the set of potential markets by determining which of the potential markets also has all of the FM stations identified by the second base station (i.e., FM stations broadcasting at all broadcast frequencies reported by the second base station), and removing those that do not from the subset of potential markets, as shown by block 1056.

When NetOps attempts to perform a triangulation-based location-determination technique based upon the reported angle-of-arrival data, but inputs incorrect locations for the corresponding signal sources (e.g., the FM stations), an error will result. In particular, triangulation will not yield a crossing point since the arrangement of the FM stations in the market in which the base station is location will differ from the arrangement of the FM stations having the same identification information in other markets. Therefore, when triangulation based on the locations of matching FM stations in one of the potential markets produces a valid crossing point, this indicates to NetOps that it has identified the market in which the base station is located, and that the crossing point is the correct location of the base station. Accordingly, once NetOps has determined a set of potential markets, NetOps may test the potential markets one at a time, applying a location determination process in each potential market until the application of the triangulation-based techniques yields a valid crossing point in one of the potential markets.

More specifically, NetOps may select a next potential market from the identified set of potential markets, as shown by block 1058. NetOps then determines which FM stations in the market match the identification information provided by the base station, and determines the geographic locations the FM stations in the potential market having the listed broadcast frequencies reported by the base station, as shown by block 1060. NetOps then attempts to triangulate the location of the second base station using the determined FM-station locations and the corresponding angles-of-arrival reported by the base station, as shown by block 1061, and determines whether a valid location results, as shown by block 1062. If a valid location (e.g., a crossing point) results, then NetOps sets this location as the location of the base station, as shown by block 1064. On the other hand, if the location-determination process fails (e.g., if no valid crossing point can be determined), then NetOps selects the next potential market, as shown by block 1008, and repeats blocks 1010 to 1012 for the next potential market. NetOps may then repeat blocks 1008-1012, attempting to determine a crossing point in each potential market until a crossing point is successfully determined in one of the potential markets.

In an alternative embodiment, before setting the determined crossing point as the location of the second base station, NetOps may verify the determined crossing point by checking whether the crossing point is within the broadcast range of the second base station. In particular, NetOps may use the reported identification information for the nearby base station to determine the nearby base station's location. Then, before setting the determined crossing point as the geographic location of the base station, NetOps may verify that the crossing point is within the broadcast range of the second base station. For example, if a macro-network base station has a broadcast range that is limited to two miles, then NetOps may verify that the crossing point and the nearby base station are within two miles from each other. It should be understood that the broadcast range of a base station may vary, and that verification of the crossing point may vary accordingly as well, without departing from the scope of the invention.

E. Other Local-Oscillator Stabilization Methods

As noted, an exemplary LTE or WiMAX base station may be configured to use an FM radio signal as a reference signal for stabilization of its local oscillator. However, since an FM signal may experience phase drift, and/or because the exact frequency of the FM signal may not be known, simply phase-locking the local oscillator to the FM signal with nothing further, would most likely result in the local oscillator failing to meet FCC requirements for accuracy. Therefore, after an exemplary base station begins providing LTE or WiMAX service (i.e., after the setup period ends), the base station periodically adjusts the local oscillator based on phase-error information provided by NetOps, in order to account for any phase drift of the FM signal. (Note that the base station may begin making such phase adjustments during the setup period as well.)

Figure 11:
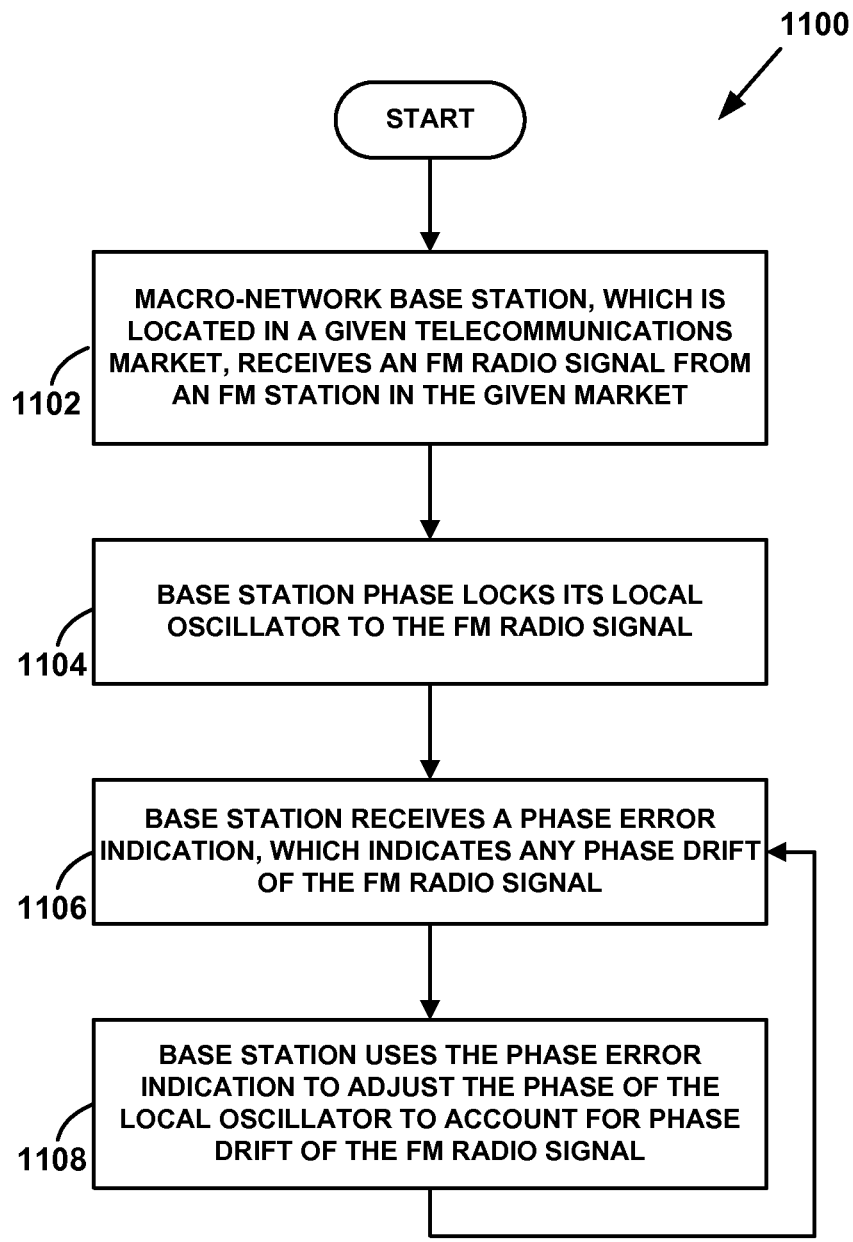
FIG. 11 is a flow chart illustrating a method for stabilizing a local oscillator, according to an exemplary embodiment.

FIG. 11 is a flow chart illustrating a method 1100 for stabilizing a local oscillator, according to an exemplary embodiment. Specifically, method 1100 involves a macro-network base station in a macro network, which is located in a given telecommunications market, receiving an FM radio signal from an FM station that is also located in the market, as shown by block 1102. The base station then phase-locks its local oscillator to the FM radio signal, as shown by block 1104. Further, the base station periodically receives a phase-error indication, which indicates any phase drift that has been experienced by the FM radio signal, as shown by block 1106. Accordingly, the base station uses the received phase-error indications to periodically adjust the phase of the local oscillator in order to account for phase drift of the FM radio signal, as shown by block 1108.

In a further aspect, an exemplary method may initially involve the base station searching for the FM radio signal having the greatest signal strength, or possibly an FM radio signal with a signal strength above a predetermined threshold. The base station may then select this FM radio signal as the signal to use for local oscillator stabilization. In addition, once a base station has selected a given FM signal, the base station may report the selection to NetOps so that NetOps can periodically provide updated phase-error information for the selected FM signal. For example, the base station may report the selected FM station to NetOps by sending NetOps a message indicating the broadcast frequency (e.g., 99.1 MHz) of the FM signal. As another example, the base station may report the call letters (e.g., WQRX) of the FM station. The base station may identify the FM radio signal in other formats and using other techniques as well.

In an alternative embodiment, during the setup period, an exemplary WiMAX base station may be further configured to perform an initial calibration of its local oscillator using the broadcast signal from a nearby macro-network base station as a reference. The nearby WiMAX base station also must comply with FCC requirements, and thus provides a reliable reference signal to use for calibration. In such an embodiment, the base station may first phase-lock its local oscillator to the LTE signal from the nearby macro-network base station. However, since the base station eventually needs to use its LTE communication interface to provide LTE service, the base station cannot continue to receive the signal from the nearby base station once it switches to operating mode, and thus cannot maintain a phase lock to the broadcast signal once it begins providing LTE service. Accordingly, after calibrating its local oscillator to the LTE signal, the base station may transfer the phase lock to an FM radio signal so that the base station may begin using its LTE interface to provide LTE service.

To implement such an alternative embodiment, an LTE or WiMAX base station may initially search for a signal from a nearby base station. For instance, typical WiMAX base stations transmit a signal within a 10.23 MHz channel allocated for macro network communications, and can vary the transmission frequency in 250 kHz steps throughout the U.S. authorized Broadband Radio Service (BRS band) frequency range of 2496 MHz to 2690 MHz. To search for the signal from a nearby base station, a given base station may scan the BRS band by certain standard channels that base stations in a given network typically operate on. These standard channels are typically predefined and may be selected as a matter of engineering design choice. Then, if no base station is found after a scan of the standard channels by, for example, adjusting the channel raster in 250 kHz steps from the standard channels. Further, when a base station acquires a signal from a nearby base station, it may check the network operator identifier in the received signal, to make sure that it is synchronizing with a base station in its own network (e.g., that is operated by the same service provider).

Once the broadcast signal from the nearby base station is acquired, the base station may stabilize its local oscillator using the broadcast signal. To use the broadcast signal as a reference for local-oscillator stabilization, the base station may need to determine the precise frequency at which the nearby base station is transmitting the broadcast signal. In practice, however, a base station may only know the approximate frequency with which the nearby base station is transmitting. As such, to calibrate the local oscillator with the level of accuracy meeting FCC requirements, the base station may query NetOps for the actual transmission frequency of the nearby base station.

The base station may identify the nearby base station to NetOps by sending NetOps a request message that includes the BS_ID of the nearby base station. Macro-network base stations typically include their respective BS_IDs in their respective broadcast signals. Accordingly, the second base station may learn the BS_ID of the nearby base station in the broadcast signal it receives from the nearby base station. NetOps preferably responds to the base station with a message that indicates the actual frequency at which the nearby base station is operating. To facilitate the query, NetOps may accordingly maintain or have access to a database indicating the frequency of operation of each base station in the macro network. Further, so that NetOps can populate this database, each base station in the macro network may routinely report its frequency of operation (i.e., its transmission frequency) to NetOps. Therefore, provided with the BS_ID for a given base station, NetOps can simply look up the actual frequency of operation for the base station, and respond to the querying base station by indicating the actual frequency, so that the base station can stabilize its local oscillator.

Figure 12:
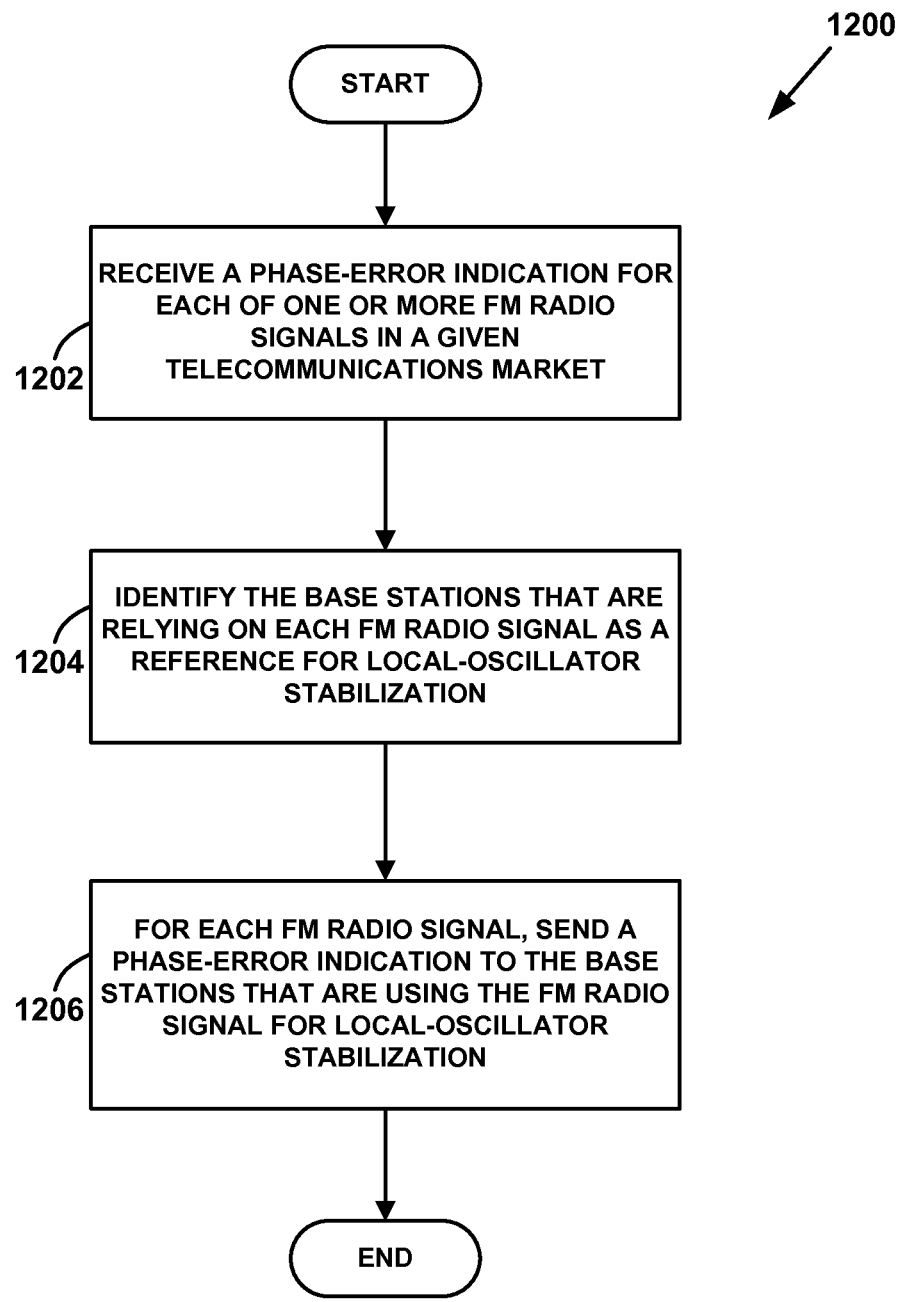
FIG. 12 is flow chart illustrating a method for facilitating local-oscillator stabilization at one or more base stations in a macro network, according to an exemplary embodiment.

FIG. 12 is flow chart illustrating a method 1200 for facilitating local-oscillator stabilization at one or more base stations in a macro network, according to an exemplary embodiment. In particular, method 1200 may be carried out by NetOps (or possibly another macro-network entity) to distribute phase-error indications received from various IMBMs, to the appropriate macro-network base stations. As shown, method 1200 involves NetOps receiving a phase-error indication for each of one or more FM radio signals in a given telecommunications market, as shown by block 1202. When updated phase-error information is received, NetOps identifies the base stations that are relying on each of the FM radio signals as a reference for local-oscillator stabilization, as shown by block 1204. Then, for each FM radio signal, NetOps sends a phase-error indication for the FM radio signal to the base stations that are using the FM radio signal for local-oscillator stabilization, as shown by block 1206.

In a further aspect, NetOps may be configured to periodically provide a phase-error indication to each base station served by NetOps. In an exemplary embodiment, NetOps may provide phase-error indications every one to three seconds. However, the duration of the period between phase-error indications may be varied as a matter of engineering design choice.

Figure 13:
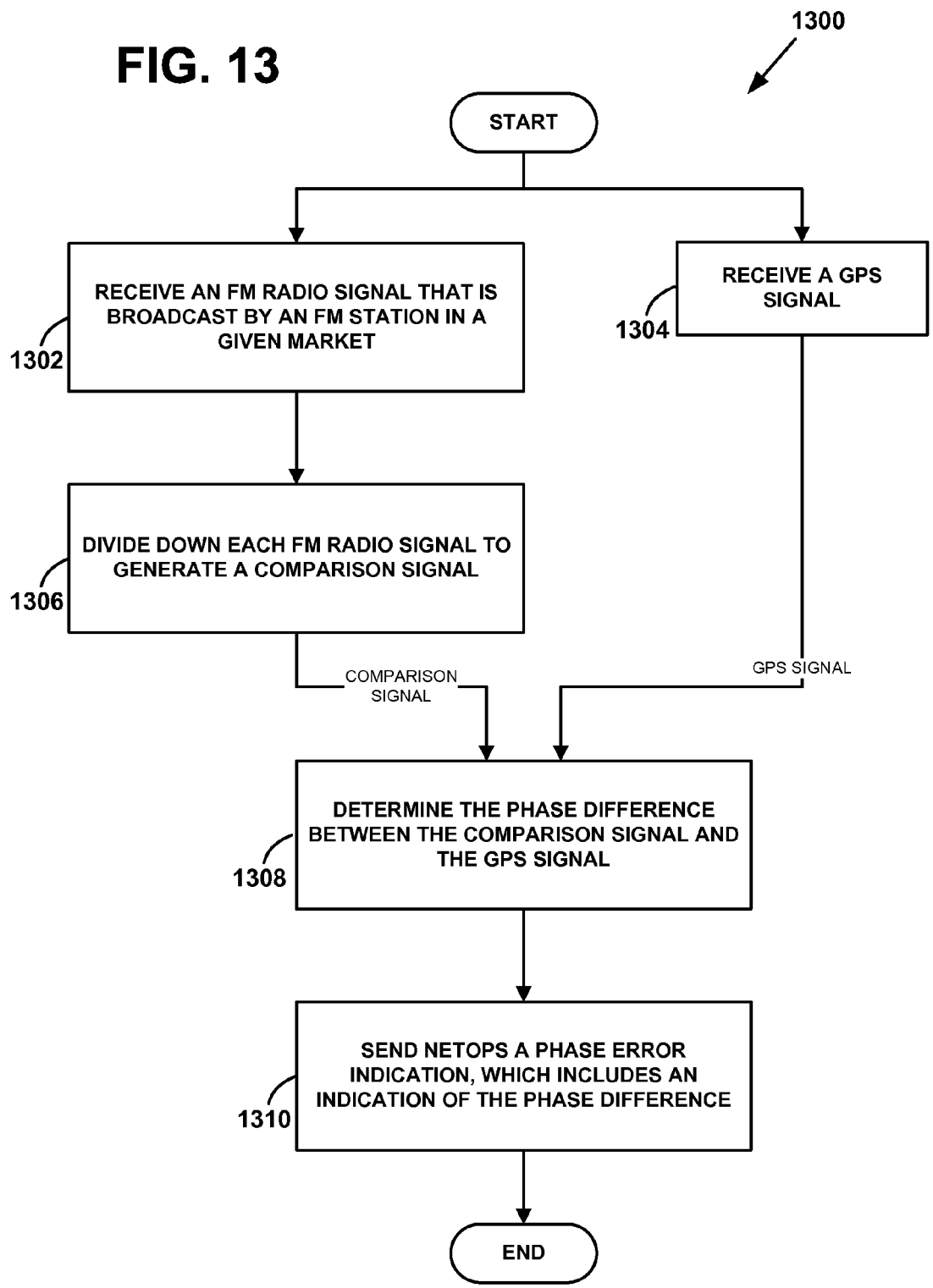
FIG. 13 is a flow chart illustrating a method that may be implemented by an in-market broadcast monitor, according to an exemplary embodiment.

As noted above, a service provider may install an IMBM in each market to provide NetOps with phase-error information for each FM radio signal in the market, so that NetOps may in turn provide the phase-error information to base stations using the FM radio signal as a reference for local-oscillator stabilization. FIG. 13 is a flow chart illustrating a method 1300 that may be implemented by an IMBM. In particular, method 1300 may be implemented by an IMBM to provide phase-error information that can ultimately be used for local-oscillator stabilization by macro-network base stations.

As shown, method 1300 involves the IMBM receiving an FM radio signal that is broadcast by an FM station in a given telecommunications market, as shown by block 1302. The IMBM also receives a GPS signal, as shown by block 1304. The IMBM then determines a phase error for the FM radio signal. In particular, the IMBM divides down the FM radio signal to generate a comparison signal, as shown by block 1306. The IMBM then determines the phase difference between the comparison signal and the GPS signal, as shown, as shown by block 1308. The IMBM can then provide the phase error of the FM radio signal, which is indicated by the phase difference between the comparison signal and the GPS signal, for use by one or more base stations in the macro network. For example, the IMBM may send NetOps a phase-error indication, which indicates the phase difference between the comparison signal and the GPS signal, as shown by block 1310. NetOps may then disseminate the phase-error indication to those base stations relying on the given FM radio signal. Furthermore, an exemplary IMBM may repeat method 1300 for each FM signal that is broadcast in its market.

In an exemplary embodiment, IMBM 616 may calculate the phase error of a given FM signal by dividing down the FM signal to 10.23 MHz, and comparing the result to the 10 MHz GPS reference signal. (Note that in practice, the GPS reference signal is typically 10.23 MHz, but 10 MHz is used as an example to simplify calculations.)

For example, to divide down the FM radio signal, the IMBM 616 may divide the FM signal by a signal having a frequency such that the comparison signal should be a 10 MHz signal. For instance, if a given FM station has a listed broadcast frequency of 99.1 MHz, the IMBM 616 may divide the FM radio signal from the FM station digitally by a 9,910,000. If the actual broadcast frequency of the FM radio signal is 99.1 MHz, then this will result in a comparison signal that is 10.23 MHz. However, because the FM signal may have experienced phase drift, the comparison signal produced by dividing down the FM radio signal is unlikely to be exactly 10.23 MHz. Therefore, to calculate the phase drift (i.e., the deviation of the output signal from 10.23 MHz), IMBM 616 compares the output signal to a 10.23 MHz reference signal that is known to be accurate, such as a 10.23 MHz GPS timing signal.

In practice, the FM signal may be divided down using a digital counter. More specifically, the FM signal may be input into the digital counter, which then outputs a transition periodically whenever it reaches an achieving count. In particular, the IMBM may be configured to generate output pulse each time a given count is satisfied. The period between occurrences of this pulse may then be phase-compared to the period between pulses in a reference-pulse signal, and a difference voltage may then be generated. This difference voltage is then converted to a proportional positive or negative numeric value (i.e., the phase-error indication, which may also be referred to as a phase offset value) and provided to the appropriate base stations to use to correct the phase of their respective local oscillators. Accordingly, an exemplary IMBM may include: (i) a divider, and (ii) a phase comparator that is configured to compare the output of the divider and the GPS reference signal to determine the phase offset value to be provided to the base stations.

In a further aspect, an exemplary IMBM may be configured to periodically determine and provide phase-error indications to NetOps. In an exemplary embodiment, each IMBM may provide phase-error indications every one to three seconds. However, the duration of the period between phase-error indications may be varied as a matter of engineering design choice.

F. Other Frame-Start Synchronization Methods

In an exemplary embodiment, a macro-network base station is preferably configured to provide service by transmitting a broadcast signal that is synchronized with the broadcast signals from nearby base stations. In particular, as the macro-network signal is structured as a series of frames of a predetermined duration, the base station may achieve what may be referred to as "frame-start synchronization" by synchronizing the time at which the transmission of each frame is initiated with nearby base stations. An exemplary base station preferably accomplishes frame-start synchronization without a GPS signal, and thus does not require line-of-sight access to a GPS satellite for frame-start synchronization.

Figure 14A:
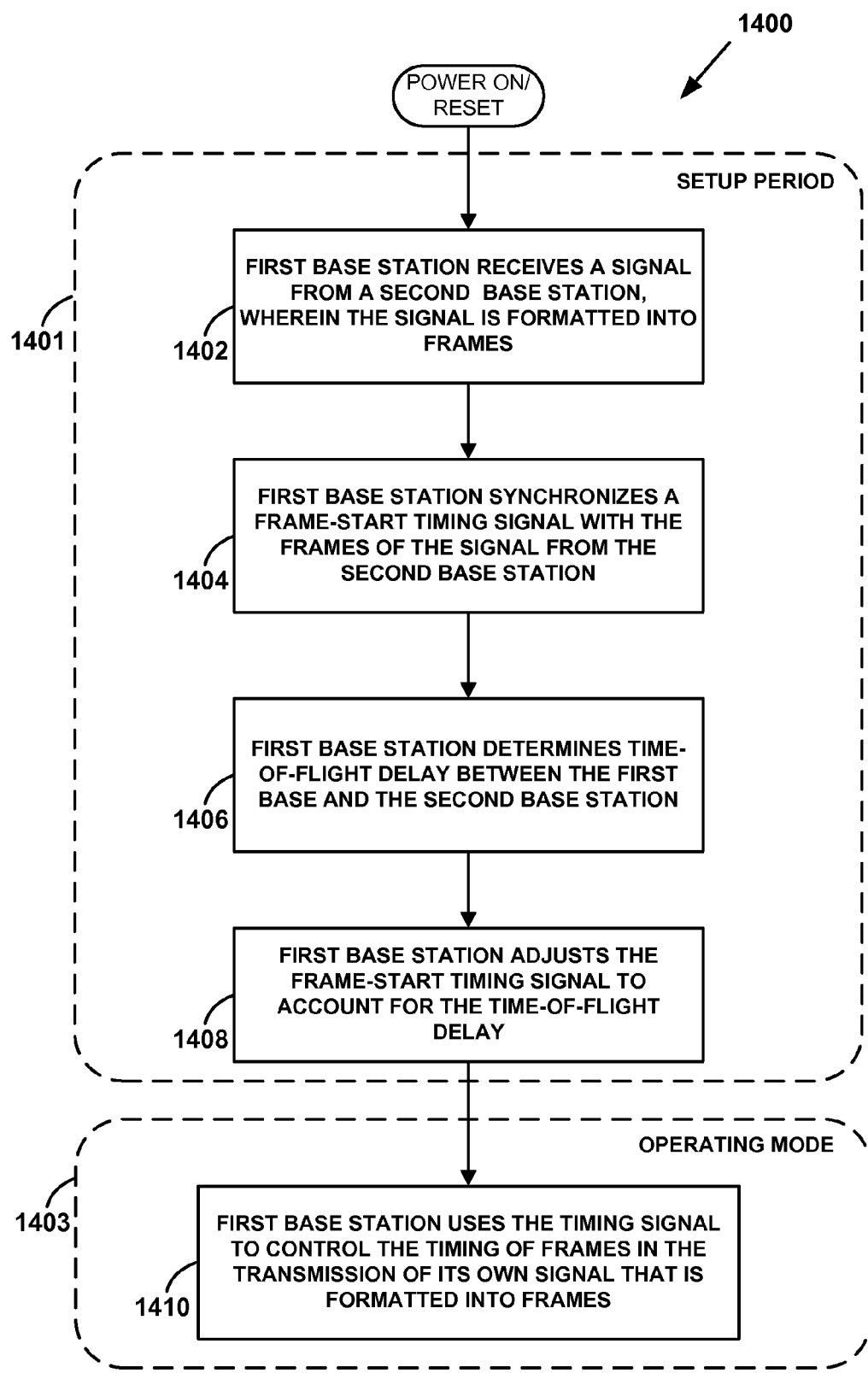
FIG. 14A is a flow chart illustrating a method for frame-start synchronization, according to an exemplary embodiment.

FIG. 14A is a flow chart illustrating a method 1400 for frame-start synchronization, according to an exemplary embodiment. As part of its setup routine, a base station may carry out a first portion 1401 of the method 1400 in which it establishes a frame-start timing signal that is synchronized to frames in a broadcast signal from a nearby base station. The timing signal may then be used to control frame transmissions in a second portion 1403 of the method 1400, which the base station carries out once the base station switches to its operating mode.

More specifically, method 1400 involves a second macro-network base station receiving a first broadcast signal from a first macro-network base station, where the first signal is formatted into frames, as shown by block 1402. The first base station then synchronizes a frame-start timing signal with the frames in the first signal, as shown by block 1404. In particular, the second base station synchronizes frame-start triggers with the receipt of frames from the second base station. As such, the frequency of the frame-start triggers in the timing signal is matched to the frequency of frame transmissions by the second base station. However, because of the time-of-flight delay between the second base station and the first base station, the periodic frame-start triggers are out of synchronization with the actual transmission of the frames by the second base station.

Accordingly, the first base station determines the time-of-flight delay between the second base station and the first base station, as shown by block 1406. The first base station may then adjust the timing offset of the frame-start signal to account for the time-of-flight delay, as shown by block 1408. By accounting for the time-of-flight delay, the periodic frame-start trigger in the timing signal is synchronized to the timing of frame transmissions by the second base station. Therefore, when the first base station ends its setup routine and switches to operating mode, the first base station may use the frame-start timing signal to control the timing of frames in the transmission of its own broadcast signal, which is likewise formatted into frames, as shown by block 1410.

Preferably, the determination of the time-of-flight delay between the second base station and the first base station involves the first base station querying NetOps for the time-of-flight delay. Since the speed at which the signal travels is typically a known value, the calculation of the time-of-flight delay between a signal source and a recipient typically involves determining the distance between the source and the recipient. Accordingly, the first base station's query to NetOps preferably includes: (i) the identifier of the second base station and (ii) and the geographic location of the first base station. NetOps may use the identifier of the second base station to look up the location of the second base station, and then determine the distance between the second base station's location and the first base station's location.

Furthermore, in order that the first base station can provide its geographic location to NetOps without using GPS, the first base station preferably determines its location using a technique that does not involve GPS. For example, the second base station may use a location-determination method described herein, such as method 1000 of FIG. 10A. However, it is also possible that the second base station may determine its location in another manner, without departing from the scope of the invention.

Figure 14B:
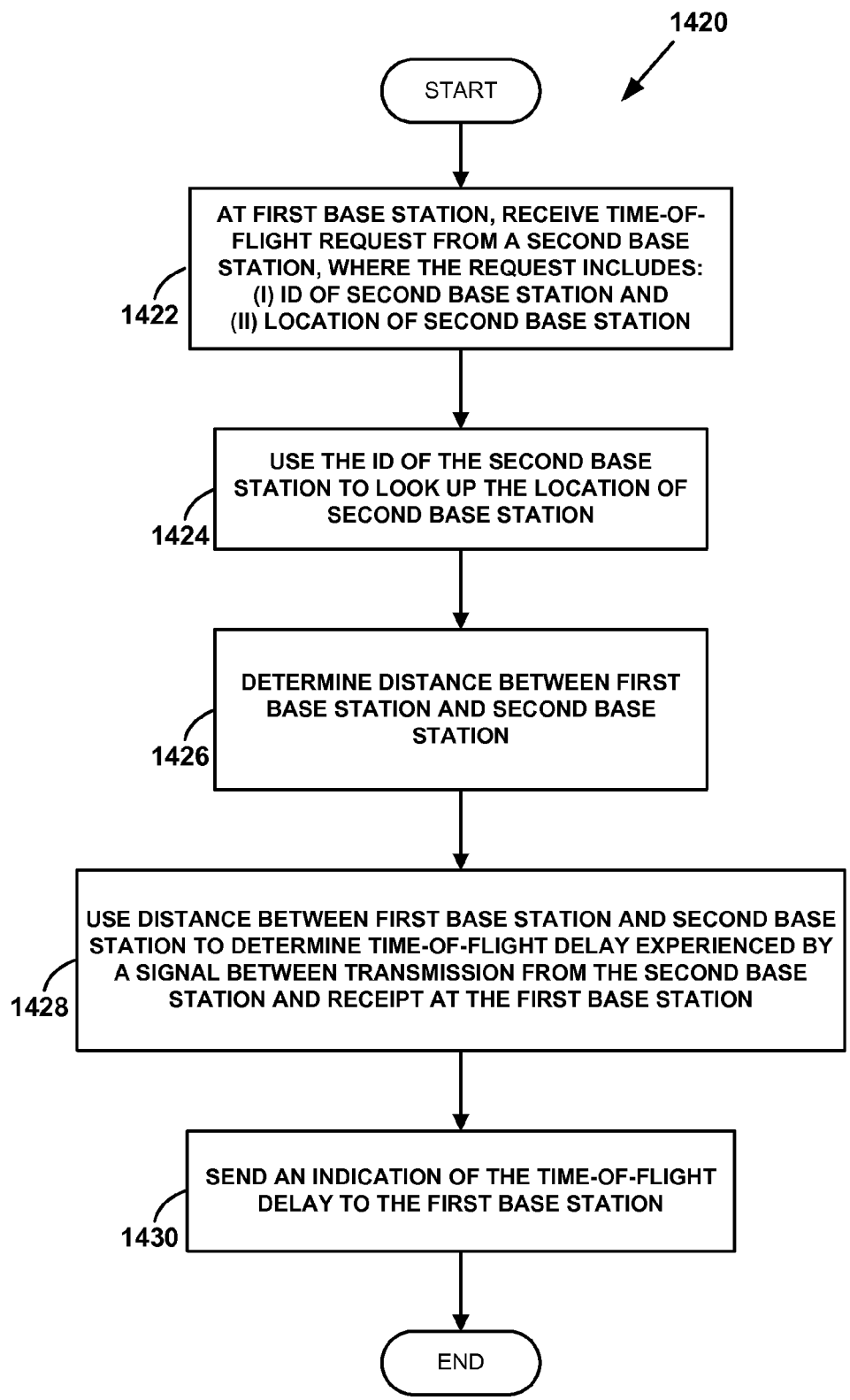
FIG. 14B is a flow chart illustrating a method for facilitating frame-start synchronization of a base station, according to an exemplary embodiment.

FIG. 14B is a flow chart illustrating a method 1420 for facilitating frame-start synchronization of a base station, according to an exemplary embodiment. Method 1420 may be carried out by NetOps or another core-network entity in order to provide a base station with the time-of-flight delay from a nearby base station, so that the base station can synchronize its frame transmissions with the nearby base station.

As shown, method 1420 involves NetOps receiving a time-of-flight request from the first base station, where the time-of-flight request includes (i) an identifier of a second base station, and (ii) the geographic location of the first base station, as shown by block 1422. NetOps then uses the identifier of the second base station to look up the location of the second base station, as shown by block 1424. Provided with the locations of the first and first base stations, NetOps can then determine the distance between the second base station and the first base station, as shown by block 1426. NetOps then uses the distance between the second base station and the first base station to determine the time-of-flight delay experienced by a signal between transmission from the second base station and receipt at the first base station, as shown by block 1428. NetOps may then send an indication of the time-of-flight delay to the first base station, as shown by block 1430.

III. Combinations of Techniques to Provide Base-Station Functions Without GPS

As noted above, macro base stations may utilize a GPS signal for various functions, including: (1) stabilizing a local oscillator, (2) frame-start synchronization, (3) acquiring time-of-day information, and (4) determining their own geographic location. Further, the above sections detail multiple ways of achieving each of these functions, without receiving a GPS signal at the base station. In various embodiments, a base station may "mix and match" different alternative techniques to provide different combinations of these functions without receiving a GPS signal. As such, there may be a number of different ways that a macro base station can achieve full functionality when a GPS signal is not available. Further, in some embodiments a macro base station may be configured for multiple non-GPS-based techniques for the same function, which can provide redundancy.

As an example, a macro base station may be configured to use a subcarrier of a terrestrial broadcast signal to stabilize its local oscillator (e.g., as shown in FIG. 4), and to coordinate with one or more other base stations for frame-start synchronization (e.g., as shown in FIG. 14A). Further, such a macro base station may be configured to extract time of day information from the subcarrier of a terrestrial broadcast signal. In addition, such a macro base station may be configured to use a number of FM radio signals to determine its own location; e.g., as shown in FIGS. 10A and 10B. Alternatively, such a macro base station could be pre-programmed with its location or configured to determine its location using other non-GPS means (such as a local Internet connection, for instance).

In a configuration where a macro base station can achieve the same function using multiple non-GPS-based techniques, a macro base station may be configured to dynamically determine which non-GPS-based technique to utilize. For example, a macro base station may select a local-oscillator stabilization process from a plurality of local-oscillator stabilization processes, and then apply the selected local-oscillator stabilization process to stabilize its local oscillator. In an example embodiment, a macro base station may be configured for both: (a) a first local-oscillator stabilization process that uses a phase-locked subcarrier signal from an FM radio signal to stabilize the local oscillator and (b) a second local-oscillator stabilization process that phase-locks the local oscillator to the FM radio signal itself and periodically uses phase-error indications to adjust the phase of the local oscillator. The macro base station may then dynamically switch between these two local-oscillator stabilization processes (and possibly other processes) based on various factors.

As another example, a macro base station may select a location-determination process from a plurality of location-determination processes, and then use the selected location-determination process to determine its own geographic location. Alternatively, in some embodiments, a device may utilize multiple location-determination processes, and compare and/or combine the results to determine its geographic location.

As yet another example, a macro base station may select a frame-start synchronization process from a plurality of frame-start synchronization processes, and then use the selected frame-start synchronization process to transmit the frames under a wireless communication protocol such as LTE or WiMAX. For instance, in some embodiments, a base station may be configured for both: (i) a first frame-start synchronization process that uses a signal from another base station that is transmitted under a wireless communication protocol such as LTE or WiMAX, to determine timing for transmission of its own frames under the same protocol, and (ii) a second frame-start synchronization process that involves using a timing signal from a subcarrier of a terrestrial broadcast signal (e.g., an FM radio signal) to determine the timing with which it transmits frames under a wireless communication protocol such as LTE or WiMAX.

In a further aspect, a macro base station may include a GPS receiver, and may only implement non-GPS-based techniques such as those described herein, in response to determining that it is unable to obtain a GPS signal via its GPS receiver (or, in some embodiments, in response to determining that the GPS signal is not providing an accurate location).

IV. Conclusion

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodi-

We claim:

1. A method comprising:
a first base station in a cellular macro network receiving a terrestrial broadcast signal from a broadcast station, wherein the signal comprises a subcarrier signal, and wherein the terrestrial broadcast station has phase-locked the subcarrier signal to a GPS signal;
the first base station decoding the terrestrial broadcast signal to acquire the subcarrier signal;
the first base station using the subcarrier signal to stabilize a local oscillator at the base station, wherein the local oscillator is used by the first base station to maintain signal stability for wireless communications;
the first base station receiving a first signal from a second base station in the macro network, wherein the first signal comprises frames;
the first base station synchronizing a frame-start timing signal with the frames in the first signal;
the first base station determining a time-of-flight delay between the second base station and the first base station;
the first base station adjusting timing of the frame-start timing signal to account for the time-of-flight delay between the second base station and the first base station;
the first base station using the adjusted frame-start signal to determine timing for transmission of frames of a second signal by the first base station; and
the first base station transmitting the second signal, wherein the frames of the second signal are transmitted according to the determined timing.

2. The method of claim 1, further comprising:
the first base station receiving a plurality of FM radio signals, wherein the terrestrial broadcast signal is one of the plurality of received FM radio signals; and
the first base station using the plurality of received FM radio signals as a basis for determining a geographic location of the first base station.

3. The method of claim 2, wherein each of the received FM radio signals is broadcast at a certain broadcast frequency by an FM radio station in the given telecommunications market, and wherein using the plurality of received FM radio signals as a basis for determining a geographic location of the first base station comprises:
for each received FM radio signal, determining an angle of arrival of the FM radio signal at the base station;
sending a location request to a network operations center, wherein the location request comprises the broadcast frequency and the determined angle of arrival for each of the FM radio signals; and
receiving a response to the location request from the network operations center, wherein the response indicates the geographic location of the first base station, and wherein the broadcast frequency and the determined angle of arrival for each of the FM radio signals are both used as a basis to determine the geographic location.

4. The method of claim 1, further comprising:
determining that a GPS signal is unavailable at the first base station; and
perform the method of claim 1 in response to the determination that the GPS signal is unavailable at the first base station.

5. The method of claim 1, wherein the first base station wirelessly transmits the second signal according to a Long Term Evolution (LTE) protocol.

6. A system of a first base station comprising:
at least one receiver configured to receive a terrestrial broadcast signal, wherein the broadcast signal comprises a subcarrier signal that has been phase-locked to a GPS signal by the terrestrial broadcast station;
a decoder configured to decode the terrestrial broadcast signal to acquire the phase-locked subcarrier signal;
a local oscillator that is operable to stabilize wireless signal transmissions by a base station;
at least one receiver configured to receive a first signal from a second base station in the macro network, wherein the first signal comprises frames;
a non-transitory tangible computer-readable medium; and
program instructions stored on the non-transitory tangible computer-readable medium and executable by at least one processor to cause the core-network entity to:
use the phase-locked subcarrier signal to stabilize the local oscillator;
synchronize a frame-start timing signal with the frames in the first signal;
determine a time-of-flight delay between the second base station and the first base station:
adjust timing of the frame-start timing signal to account for the time-of-flight delay between the second base station and the first base station;
use the adjusted frame-start signal to determine timing for transmission of frames of a second signal from the first base station; and
operate a transmitter of the first base station to transmit the second signal, wherein the frames of the second signal are transmitted according to the determined timing.

7. The system of claim 6, wherein the at least one receiver configured to receive the terrestrial broadcast signal comprises one or more receivers configured to receive a plurality of FM radio signals, and wherein the terrestrial broadcast signal is one of the plurality of received FM radio signals, the system further comprising:
program instructions stored on the non-transitory tangible computer-readable medium and executable by at least one processor to use the plurality of received FM radio signals as a basis for determining a geographic location of the first base station.

8. The system of claim 7, wherein each of the received FM radio signals is broadcast at a certain broadcast frequency by an FM radio station in the given telecommunications market, and wherein the program instructions stored on the non-transitory tangible computer-readable medium and executable by at least one processor to use the plurality of received FM radio signals as a basis for determining a geographic location of the first base station comprise program instructions stored on the non-transitory tangible computer-readable medium and executable by at least one processor to:
for each received FM radio signal, determine an angle of arrival of the FM radio signal at the base station;
send a location request to a network operations center, wherein the location request comprises the broadcast frequency and the determined angle of arrival for each of the FM radio signals; and
receive a response to the location request from the network operations center, wherein the response indicates the geographic location of the first base station, and wherein the broadcast frequency and the determined angle of arrival for each of the FM radio signals are both used as a basis to determine the geographic location.

9. The system of claim 6, wherein the terrestrial broadcast signal comprises an FM radio signal, the system further comprising program instructions stored on the non-transitory tangible computer-readable medium and executable by at least one processor to stabilize the local oscillator by phase-locking the local oscillator to the FM radio signal.

10. The system of claim 9, wherein the terrestrial broadcast signal comprises an FM radio signal, the system further comprising program instructions stored on the non-transitory tangible computer-readable medium and executable by at least one processor to stabilize the local oscillator by:
 phase-locking the local oscillator to the FM radio signal;
 periodically receiving phase-error indications, wherein each received phase-error indication indicates phase drift of the FM radio signal; and
 using each received phase-error indication to adjust the phase of the local oscillator in order to account for phase drift of the FM radio signal.

11. The system of claim 9, further comprising program instructions stored in a tangible computer readable medium and executable by at least one processor to:
 select a local-oscillator stabilization process from a plurality of local-oscillator stabilization processes that comprise at least a first and a second local-oscillator stabilization process; and
 apply the selected local-oscillator stabilization process.

12. The system of claim 11:
 wherein the first local-oscillator stabilization process uses the phase-locked subcarrier signal to stabilize the local oscillator; and
 wherein the second local-oscillator stabilization process phase-locks the local oscillator to the FM radio signal and periodically uses phase-error indications to adjust the phase of the local oscillator, wherein each phase-error indication indicates phase drift of the FM radio signal.

13. The system of claim 6, further comprising program instructions stored in a tangible computer readable medium and executable by at least one processor to:
 select a location-determination process from a plurality of location-determination processes that comprise at least a first and a second location-determination process; and
 use the selected location-determination process to determine a geographic location of the first base station.

14. The system of claim 13, wherein the plurality of location-determination processes are not reliant on receipt of a GPS signal at the first base station, the system further comprising program instructions stored in a tangible computer readable medium and executable by at least one processor to:
 determine that a GPS signal is unavailable to the first base station, wherein the selection and use of the selected location-determination process is responsive to a determination that the GPS signal is unavailable to the first base station.

15. The system of claim 6, further comprising program instructions stored in a tangible computer readable medium and executable by at least one processor to:
 select a frame-start synchronization process from a plurality of frame-start synchronization processes that comprise at least a first and a second frame-start synchronization process; and
 use the selected frame-start synchronization process to transmit the frames of the second signal.

16. system of claim 15:
 wherein the first frame-start synchronization process comprises use of the first signal from the second base station to determine timing for transmission of the frames of the second signal from the first base station; and
 wherein the second frame-start synchronization process comprises: (i) demodulating the subcarrier signal to acquire a timing signal that is modulated thereon, and (ii) using timing information provided by the timing signal as a basis for frame-start synchronization of the second signal.

17. The system of claim 16, wherein the timing signal comprises a frequency shift keying (FSK) timing signal, and wherein using the timing information provided by the timing signal as a basis for frame-start synchronization of the second signal comprises:
 detecting when transitions in the FSK timing signal occur; and
 based at least in part on when the transitions in the FSK timing signal occur, determining the timing with which to transmit data frames.

18. The system of claim 6, wherein the second signal is transmitted from the first base station under a Long Term Evolution (LTE) protocol.

* * * * *